(12) United States Patent
Nauck et al.

(10) Patent No.: US 7,272,586 B2
(45) Date of Patent: Sep. 18, 2007

(54) METHOD AND APPARATUS FOR DATA ANALYSIS

(75) Inventors: Detlef D Nauck, Ipswich (GB); Martin Spott, Ispwich (GB); Benham Azvine, Ipswich (GB)

(73) Assignee: British Telecommunications public limited company, London (GB)

(*) Notice: Subject to any disclaimer, the term of this patent is extended or adjusted under 35 U.S.C. 154(b) by 363 days.

(21) Appl. No.: 10/488,782

(22) PCT Filed: Sep. 24, 2002

(86) PCT No.: PCT/GB02/04328

§ 371 (c)(1),
(2), (4) Date: Mar. 5, 2004

(87) PCT Pub. No.: WO03/027899

PCT Pub. Date: Apr. 3, 2003

(65) Prior Publication Data

US 2004/0249779 A1    Dec. 9, 2004

(30) Foreign Application Priority Data

Sep. 27, 2001 (EP) ................ 01308260
Sep. 27, 2001 (EP) ................ 01308261
Sep. 27, 2001 (EP) ................ 01308280

(51) Int. Cl.
G06F 9/44       (2006.01)
G06N 7/02       (2006.01)
G06N 7/06       (2006.01)

(52) U.S. Cl. ................................. 706/52

(58) Field of Classification Search .......... 706/52, 706/47
See application file for complete search history.

(56) References Cited

U.S. PATENT DOCUMENTS

| 5,524,176 | A  |   | 6/1996  | Narita et al. ........... 706/2 |
| 5,577,169 | A  | * | 11/1996 | Prezioso ............... 706/52 |
| 5,721,903 | A  |   | 2/1998  | Anand et al. ........... 707/5 |
| 5,724,488 | A  | * | 3/1998  | Prezioso ............... 706/52 |
| 6,078,924 | A  |   | 6/2000  | Ainsbury et al. ...... 707/101 |
| 6,236,978 | B1 | * | 5/2001  | Tuzhilin ............... 705/26 |
| 6,839,680 | B1 | * | 1/2005  | Liu et al. .............. 705/10 |

(Continued)

FOREIGN PATENT DOCUMENTS

DE          19537010 A1     4/1997

(Continued)

OTHER PUBLICATIONS

Dickerson et al, "Fuzzy Network Profiling for Intrution Detection", IEEE NAFIPS, Jul. 2000.*

(Continued)

Primary Examiner—Anthony Knight
Assistant Examiner—Michael B. Holmes
(74) Attorney, Agent, or Firm—Nixon & Vanderhye P.C.

(57) ABSTRACT

Data analysis methods are characterized in terms of tangible and non-tangible parameters such as user-friendliness, accuracy, simplicity, interpretability, speed, cost, comprehensibility, and transparency, and then matched to pre-specified requirements. A data analysis method is selected in accordance with a user preference, wherein the user preference relates to a feature of the data analysis method and is represented by a fuzzy set comprising a range of values.

12 Claims, 12 Drawing Sheets

U.S. PATENT DOCUMENTS 6,871,186 B1* 3/2005 Tuzhilin et al. .............. 705/26
2003/0037063 A1* 2/2003 Schwartz ................ 707/104.1

FOREIGN PATENT DOCUMENTS

| DE | 19914277 A1 | 10/2000 |
|---|---|---|
| WO | WO 95/02855 | 1/1995 |
| WO | WO 96/1608 | 5/1996 |

OTHER PUBLICATIONS

Liggesmeyer, "Selecting Engineering Techniques using Fuzzy Logic Based Decision Support", Engineering of Computer-Based Systems, 1996. Proceedings., IEEE Symposium and Workshop on Friedrichshafen, Germany, Mar. 11-15, 1996, Los Alamitos, CA, USA, IEEE, Comput. Soc., US, Mar. 11, 1996, pp. 427-434, XP010159694.

Lelescu et al., "Approximate Retrieval from Multimedia Databases Using Relevance Feedback", String Processing and Information Retrieval Symposium, 1999 and International Workshop on Groupware Cancun, Mexico Sep. 22-24, 1999, Los Alamitos, CA, USA, IEEE Comput. Soc., US, Sep. 22, 1999, pp. 215-223, XP010353490.

Medasani et al., "A Fuzzy Approach to Content-based Image Retrieval", Fuzzy Systems Conference Proceedings, 1999, Fuzz-IEEE '99, 1999 IEEE International Seoul, South Korea Aug. 22-25, 1999, Piscataway, NJ, USA, IEEE, US, Aug. 22, 1999, pp. 1251-1260, XP010350791.

Frigui, "Adaptive Image Retrieval Using the Fuzzy Integral", North American Fuzzy Information, 1999, Piscataway, NJ, USA, IEEE, US, Jun. 10, 1999, pp. 575-579, XP010342957.

Nauck et al., "Obtaining Interpretable Fuzzy Classification Rules from Medical Data", Artificial Intelligence in Medicine, Jun. 1999, Elsevier, Netherlands, vol. 16, No. 2, pp. 149-169, XP002209444.

Nauck et al., "Neuro-Fuzzy Systems for Function Approximation", Fuzzy Sets and Systems, North-Holland, Amsterdam, NL., vol. 101, No. 2, Jan. 16, 1999, pp. 261-271, XP004158428.

Kors et al., Induction of Decision Rules that Fulfil User-Specified Performance Requirements Pattern Recognition Letters, North-Holland Publ. Amsterdam, NL., vol. 18, No. 11-13, Nov. 1, 1997.

* cited by examiner

METHOD AND APPARATUS FOR DATA ANALYSIS

This application is the US national phase of international application PCT/GB02/04328 filed 24 Sep. 2002 which designated the U.S. and claims benefit of 01308280.5, 01308261.5 and 01308260.7, dated 27 Sep. 2001, respectively, the entire content of which is hereby incorporated by reference.

BACKGROUND

1. Technical Field

The present invention relates to a method and apparatus for data analysis, and is particularly, but not exclusively, suited to selecting methods for analysing data.

2. Related Art

In many situations, information is derived from previously observed data. Thus decisions and recommendations, which are dependent on that information, are dependent on the ways in which data is analysed. For example, in forecasting the weather, predicting the behaviour of stock markets, identifying prospective customers, recognising objects and patterns in images, etc, previously observed data is analysed and used to form the basis of predictions and classifications.

Data analysis always has some objective, which is typically framed in the form of one or more questions to be answered. Examples of such questions include: Are there relevant structures in the data? Are there anomalous records? How can the data conveniently be summarised? Are these two groups different? Can the value of this attribute be predicted from measured values?

Recent advances in computer technology not only allow us to gather and store a continually increasing volume of data, but also enable us to apply an increasingly diverse range of analysis techniques in an attempt to understand the data. Such a diverse range of analysis techniques is a mixed blessing: in general, for a given set of data, several methods could be applied, each with subtle differences, preconditions or assumptions. Moreover, these methods often have rather complex interrelationships, which must be understood in order to exploit the methods in an intelligent manner.

Essentially, therefore, data analysis cannot be viewed as a collection of independent tools, and some a priori knowledge of the methods is required.

A further problem with data analysis is that questions relating to the data are usually not formulated precisely enough to enable identification of a single data analysis method, or a particular combination of data analysis methods. Very often new questions arise during the analysis process, as a result of the analysis process itself, and these typically require iterative application of other methods.

Typically whoever (or, if the data analysis is performed automatically, whatever) analyses the data is not an expert in analysis methods per se: he understands the application area, or domain, in which the data has been collected, but is not intimate with the workings of the analysis methods themselves. Geologists or physicians, for example, are not interested in the mathematical foundations of the analysis methods they apply to their data, but in the answers to questions such as, where to drill for oil, or which treatment is best for a certain disease. This is quite a common situation—there is no expectation of, for example, a driver to be capable of repairing his car or of a computer user to understand the function of a central processing unit (CPU). The point is that data analysis is a practical area and data analysis methods nowadays—with the help of the computer—are used as tools.

Known data analysis tools include statistical techniques, (e.g. SPSS: "SPSS 10.0 Guide to Data Analysis", Marija J. Norusis, Prentice Hall, 2000, ISBN: 0130292044; Statistica: "Statistica Software", Statsoft, International Thomson Publishers, 1997, ISBN: 0213097732). These statistical tools provide state of the art statistics, but usually only include a few artificial intelligence or soft computing techniques. Specialised data mining tools (e.g. IBM Intelligent Miner, Data Engine, Clementine) provide some machine learning (ML) techniques like top-down induction of decision trees (TDIDT) or neural networks (NN) but are often weak in statistics methods.

Both the statistical and data mining kinds of tools are method-oriented. They require the user to select an analysis method that then fits a model to the data. The tools do not support an exploratory approach and do not suggest appropriate analysis methods to the user. In addition these methods are unable to automatically select analysis strategies.

BRIEF SUMMARY

According to a first aspect of the present invention there is provided a method of selecting a data analysis method in accordance with a user preference, wherein the user preference relates to a feature of the data analysis method and is represented by a fuzzy set comprising a range of values, the method comprising the steps of (i) using the user preference to identify one or more rules corresponding to the user preference, each rule comprising at least one fuzzy set that relates features of data analysis methods to data analysis characteristics;

(ii) evaluating the or each identified rule, thereby identifying an instance of a data analysis characteristic associated with the identified rule, the instance comprising a fuzzy set having a range of values;

(iii) retrieving data identifying a plurality of data analysis methods, each of which has a plurality of data analysis characteristics, wherein, in respect of each said data analysis characteristic, the retrieved data includes a range of values;

(iv) comparing the retrieved data with the data analysis characteristic instance in order to identify a data analysis method that matches the user preference.

The user preference may include descriptions of features of a data analysis method, such as user-friendliness, simplicity, and maintainability. In the following description, a feature of a data analysis method is also referred to as a user characteristic.

A description may be, e.g. high, so that the user preference is for high simplicity. Rules including user preference relate user preference to one or more data analysis characteristics. Data analysis characteristics include number of parameters, level of user interaction, adaptability, customisability etc., and a rule may take the following exemplary form:

If simplicity is high then number of parameters is low

In this example, the instance of the data analysis characteristic number of parameters is low.

Preferably, when a plurality of rules is identified at step (i), the evaluating step (ii) comprises identifying occurrences of each data analysis characteristic, so that, if there is more than one occurrence of any data analysis characteristic, the evaluating step (ii) includes combining instances corresponding thereto so as to generate a combined instance of that data analysis characteristic.

Thus if there are several rules, and more than one involve the data characteristic number of parameters, the instances of each respective rule is combined to generate a combined instance for the number of parameters characteristic.

Conveniently the comparing step (iv) comprises correlating the instance identified at step (ii) with the retrieved data. Each of the data analysis methods typically has instances of data analysis characteristics (or the characteristics can be derived from a data analysis method), for at least some of the data analysis characteristics. The instance in the rule (in this example low) is compared with the instances corresponding to the data analysis methods, and whichever of these instances match the instance in the rule most closely is identified as matching the user preference most closely. Preferably the match between data analysis methods and instance(s) of data analysis characteristics is quantified as a correlation between the corresponding fuzzy sets.

Advantageously a type of data analysis method can be defined so that and the said selection of a data analysis method is performed in accordance with the predefined type. Preferably this is realised by filtering retrieved data so as to remove any data analysis methods that are not of the predefined type.

Thus, if, for example, the user were to specify that he only wanted predictive types of models, all data analysis methods not of the predictive type would be filtered out.

Additionally, the method can include modifying the fuzzy sets corresponding to at least one of the data analysis characteristics in such a manner as to increase the number of data analysis methods that match the user preference.

Particularly advantageously, the method further includes ranking the identified methods in accordance with their degree of match with the user preference; receiving an indicator representative of which of the identified data analysis methods best matches user requirements; and modifying the fuzzy set corresponding to the user preference in accordance with at least one aspect of the indicated data analysis method.

The degree of match can, for example, be given by the degree of correlation between the instance(s) of data analysis characteristic in the rule(s) and the instances in the data analysis characteristics corresponding to each of the data analysis methods. If the user indicates that a method, other than that ranked highest, meets his requirements more closely, information about that method is used to modify the fuzzy set of the user preference. In this way the fuzzy sets may be customised for individual users, based on feedback from the user; for example, the range of values defining the fuzzy set for high, for the feature "simplicity" may be different for different users, reflecting their different perceptions of a simple model.

Advantageously the data analysis method selected using the steps described above can be used to create a model. The steps involved in creating such a model include:

receiving data for use in creating a model corresponding to the identified data analysis method, the model comprising one or more model parameters;

inputting the data to a learning process associated with the model;

invoking the learning process, thereby modifying at least one of the model parameters, and monitoring the same;

comparing the or each monitored model parameter with a control rule comprising at least one fuzzy set relating to one or more model parameters, so as to identify whether the control rule should be applied, and if so, evaluating the control rule; and modifying the learning process in accordance with the evaluated rule.

An example of such data analysis methods includes a neural network, which is a data analysis method while it is learning, and thus undergoes a learning process.

A control rule can be a rule that controls aspects of the analysis method in dependence on the behaviour of the model parameters during the learning process. An example of a control rule, for the example of a neural network, is "If the error oscillates strongly, then reduce the learning rate strongly". In this example, the model parameter is "error oscillation" and the fuzzy set relating thereto is strongly. If the rule should be applied, the neural network can then be modified in accordance with the consequent part of the rule: "reduce the learning rate strongly".

Preferably the learning process is restarted in the event that such model parameters are modified; alternatively a new learning process can be selected.

Advantageously the effect of the modification on the learning process is monitored and compared with a predetermined criterion; in the event that the monitored effect does not satisfy the predetermined criterion, the control rule is modified. Conveniently modifying the control rule involves quantifying the effect of the modification on the learning process as an error value, and using the error value to modify at least one fuzzy set involved in the control rule such that the monitored modification of the learning process is observed to satisfy the predetermined criterion.

According to a second aspect of the present invention there is provided client and server apparatus corresponding to the afore-described method.

According to a third aspect of the invention there is provided a method of modifying a definition of a term for use in selection of items, where the term is defined over a range of values. The method comprises the steps of selecting two or more items that match the term;

receiving an indicator representative of which of the selected items is a best match with a specified requirement; and modifying the range of values in accordance with at least one aspect of the best match item.

An item could be an interest, a data analysis method, or a product type, and a term could be a description of the item. Thus, for example in one arrangement, the method could be applied to modify a definition of the term "cheap", which is used in selection of an item such as a restaurant.

Preferably the method further includes the steps of, for each of the selected items, evaluating a match between the range of values in the term and the range of values in a corresponding term of the selected items, and ranking the selected items in accordance with the evaluated match.

Thus, continuing with the "cheap" and "restaurants" example, if the selected items include MacDonalds and Kentucky Fried Chicken, these restaurants would have a range of values that defines their "cheapness". This range of values is compared against the default range of values corresponding to the term "cheap", and whichever of the restaurants corresponds most closely to the default range of values for "cheap" is ranked the highest.

Additionally the method includes identifying whether an item other than that ranked highest is a better match with the specified requirement, and modifying the range of values in accordance with at least one aspect of the identified best match item. The step of modifying the range of values includes comparing the range of values of the term with the range of values in the corresponding term of the identified best match item in order to evaluate an error value; and using the error value to modify the range of values in the term.

The specified requirement may comprise an indication from a user. The user may indicate that MacDonalds is a better indication of a "cheap" restaurant than Kentucky Fried Chicken, even though Kentucky Fried Chicken may correlate better with the default range of values defining "cheap". Thus the range of values defining "cheap" is modified in accordance with the range of values corresponding to MacDonalds, thereby generating a bespoke range of values defining "cheap" for this user.

This aspect of the invention therefore allows a term to be customised in accordance with user feedback.

The terms data analysis, model, predictive model, classification model, clustering model, soft computing, fuzzy system, neuro-fuzzy system, and variable, are used in the description. These are defined as follows:

"data analysis": A data analysis method creates a model from data. That model can then be used for prediction, clustering or description; e.g. a neural network is a data analysis method (while it is learning) and a model (when it has finished learning and is applied to new data). Thus data analysis is modelling, i.e. the process of creating a model.

"model": the term model is widely used in data analysis, with different meanings. For the purposes of this description, a model is a postulated structure, or an approximation to a structure, which could have led to some observed phenomenon or data. For example, in order to explain the observation that objects fall towards the centre of the earth when they are dropped, we construct a model of gravitation.

Empirical models are a type of model that describes relationships without basing them on an underlying theory. That means the model merely captures the correlations between input and output, and usually it gives us some means to estimate the probability that the output (i.e. prediction, classification etc) is correct. Thus in data analysis, empirical models are built, using observed data to determine such correlations.

"predictive model": This is a structure that helps predict the occurrence of a certain phenomenon (output data) given certain circumstances (input data). For example, the weather forecast is based on a predictive model. The model does not necessarily need to be accurate in the sense that it models the true underlying causal relationship. If a predictive model is built from data this is usually a structure that represents the correlations between input and output data. Although correlations can be sufficient to produce good predictions, they do not imply causality. An example of a predictive model is the gravitational model (as part of our physical world model), which can be used to make predictions (e.g. to calculate the exact position of any object in space (output data) based on the position and velocity of the object at some point in time (input data)).

In order to build a predictive model from data, historical data, together with the associated observed phenomenon, is required.

"classification model": A classification model is a structure that enables classification of a certain observation, i.e. it enables an observation to be described by one of several applicable meaningful labels or to be sorted into a certain set of observations. For example: the classification of patient as sick or healthy is based on a classification model (which may exist only in the head of the examining doctor). A classification model can be considered to be a special case of a predictive model, because a classification can be also seen as a prediction. For example, in database marketing there exist classifications such as "this person may be a potential customer". In order to build a classification model from data, previously classified data is required.

"clustering model": A clustering model is a special case of a classification model, and is a structure that groups observations together by similarity. The groups are called clusters. A clustering model can be built from data that is not classified by using an appropriate (postulated) similarity measure.

"soft computing": Soft computing is an approach to simulate human reasoning, which makes use of human tolerance of uncertainty and vagueness to obtain inexpensive solutions that are easy to apply to, or use with, new data, and are easy to use, operate, and maintain in applications. Fuzzy systems, neural networks, evolutionary computation and probabilistic reasoning are considered to be soft computing techniques.

"fuzzy systems": Fuzzy systems are systems that are based on fuzzy rules. A fuzzy rule comprises one or more fuzzy sets, e.g. If x is small then y is approximately zero; here small and approximately zero are fuzzy sets. Fuzzy systems can model smooth transitions between states and thus avoid counterintuitive results that can occur when boundaries of crisp states are crossed. Fuzzy systems are also known as neural fuzzy networks and/or fuzzy networks.

"neuro-fuzzy systems": A neuro-fuzzy system refers to combinations of neural networks and fuzzy systems, which in combination create a fuzzy system from data by some kind of (heuristic) learning method based on neural network learning procedures.

"variable": A variable is an item of data in a data set; it is also referred to as an attribute.

BRIEF DESCRIPTION OF THE DRAWINGS

Further aspects and advantages of the present invention will be apparent from the following description of preferred embodiments of the invention, which are given by way of example only and with reference to the accompanying drawings, in which.

DETAILED DESCRIPTION OF EXEMPLARY EMBODIMENTS

Overview of Operating Environment of Embodiments of the Invention

Figure 1:
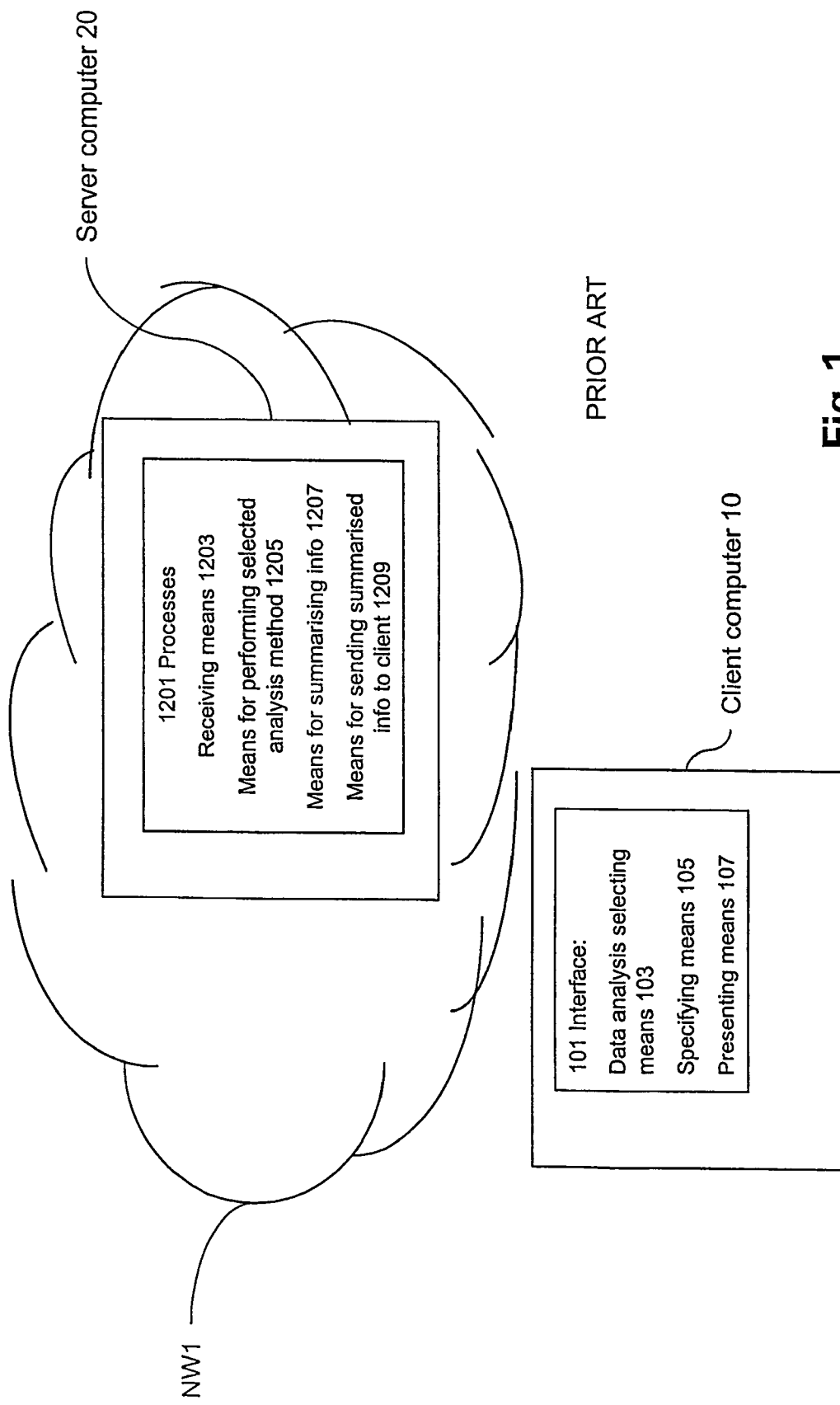
FIG. 1 is a schematic diagram showing a conventional client-server configuration arranged to perform data analysis.

FIG. 1 shows a generally conventional arrangement of computer systems 10, configured to perform data analysis according to known analysis methods. The computer systems 10, 20 are arranged in a conventional client-server relationship, wherein a first computer 10 acts as a client to a second computer 20 and communication occurs over a network NW1. In a conventional manner, data to be analysed is input to one or more processes 1201 running on the server computer 20 via an interface 101 running on the client computer 10.

The interface 101 typically includes means 103 for allowing an analysis method to be selected from a predetermined list of methods, and means 105 for allowing the user to specify data to be analysed. The predetermined list of methods may be retrieved from the server computer 20 via one of the processes 1201. The processes 1201 further include means 1203 for receiving data indicative of the selected analysis method together with the data to be analysed, and means 1205 for performing the selected analysis method. The processes 1201 further include means 1207 for summarising results of analysing the data and means 1209 for sending the summarised results to the client computer. The means 1209 for sending the summarised results may be the same means as used to send the predetermined list of methods.

The interface 101 includes means 107 for presenting the summarised results to the user.

With known systems, when performing analysis on data, users typically have a solution-oriented view: there is a problem, and data has been collected with a view to providing some information about the problem. Usually a method is selected, based on vague knowledge about some feature of the problem. This is often sub-optimal, because, as stated above, the user can be assumed to be an expert in the application area, but not in data analysis.

Embodiments of the invention arise from a realisation that the user needs support for the whole analysis process, from data pre-processing, method selection, model fitting, and solution understanding, through to generating an application from a successful model. Indeed, the fundamental realisation is that data analysis is an iterative process that should be driven by questions emanating from the user, rather than, as is the case with known methods, mere selection of a model.

Embodiments are thus concerned with providing a means of interacting with the user in order to select one or more data analysis methods that are suited both to the data to be analysed and to the user's requirements. Specifically, embodiments of the invention provide a means of characterising data analysis methods in terms of tangible and non-tangible parameters such as prior knowledge required, data required, modelling capability, customisability, and attempt to match these to the user's requirements.

The means of characterising data analysis methods in this way is provided by associating data analysis methods with fuzzy logic expressions, and equating user input, which is intrinsically fuzzy in nature, with the fuzzy logic expressions. Embodiments include a knowledge base comprising data analysis methods coupled with fuzzy logic expressions for each of a plurality of parameters such as prior knowledge required, data required, modelling capability, customisability etc. An example of a typical fuzzy set is the fuzzy set for customisability: very customisable, customisable, slightly customisable, very customisable. The fuzzy set maps onto an arbitrary scale such as [0,100]. For each data analysis method, the knowledge base stores one, or a set of, values within this scale, which is indicative of its customisability (based on a characteristic of the model such as number of hidden units, if the method is a neural network).

This approach has many advantages. Firstly, it allows disparate types of models, such as a neural network and a fuzzy system, to be assessed on a universal scale, so that a ranked list of such disparate types of models can then be recommended to the user. Secondly it allows the user to interactively select a model having characteristics such as a very accurate and very simple to analyse their data, and provide some feedback regarding, for example, the user's interpretation of "very accurate", which can be used to generate a bespoke fuzzy scale for the user.

Figure 2:
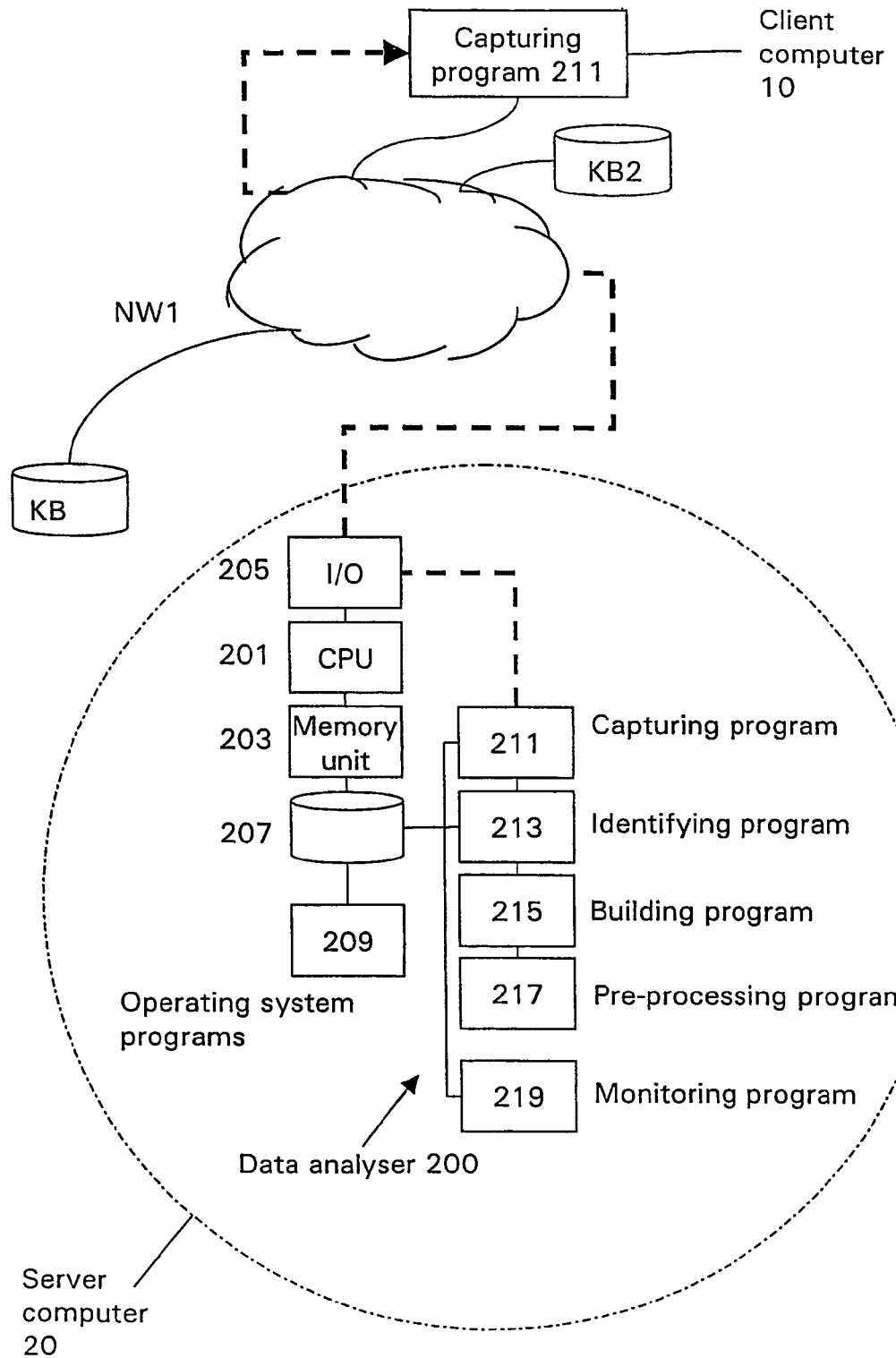
FIG. 2 is a schematic diagram of components of a data analyser according to a first embodiment of the present invention.

Referring to FIG. 2, a first embodiment of the invention will now be discussed in more detail.

FIG. 2 shows a server computer 20 comprising a central processing unit (CPU) 201; a memory unit 203; an input/output device 205 for connecting the server computer 20 to the client computer 10 via the network NW1; storage 207; and a suite of operating system programs 209, which control and coordinate low level operation of the server computer 20. Such a configuration is well known in the art.

Generally embodiments of the invention are referred to as a data analyser 200, and comprise at least some of programs 211, 213, 215, 217, 219. These programs may be stored on storage 207, or stored on a storage device (not shown) located remote from the server computer 20. The programs are processable by the CPU 201. It will be understood that each of the programs 211, 213, 215, 217, 219 comprising the data analyser 200 may comprise a suite of programs.

The programs include a program 211 for capturing analysis requirements, a program 213 for identifying one or more analysis methods that match data captured by the capturing program 211, and a program 215 for building one or more models in accordance with the identified analysis methods. The programs additionally include a program 217 for pre-processing data that has been selected for analysis, and a program 219 for evaluating model output in accordance with user feedback captured by the capturing program 211. In addition, the data analyser 200 includes one or more knowledge bases KB, KB2 which store fuzzy information relating to a plurality of data analysis methods and models. The knowledge base(s) KB, KB2 may be located on, or remote from, the server computer 20.

The following sections describe the functionality of each program making up the data analyser 200.

Capturing Program 211

The capturing program 211 manages an interactive dialogue session with the user at the client computer 10, in order to capture user requirements.

The capturing program 211 could be a Java applet running inside a browser, or a plain Hyper-Text Markup Language (HTML) form downloaded from a server computer (not necessarily the server computer 20) to the client computer 10. As an alternative to running an application within, or in operative association with, a web browser, the capturing program 211 could comprise a stand-alone program that either uses a communication protocol or uses Remote Method Invocation (where the client executes methods inside the server by calls over the network) to exchange information with a corresponding program (not shown) running on the server computer 20. In the latter case the capturing program 211 would include conventional text fields, lists, radio buttons etc. that are designed to enable a user to input requisite data, and would send data input by the user to the server upon completion of the said data input.

User requirements include type of data analysis method and user preferences. A user preference is an instance of a user characteristic; an example of a user characteristic is simplicity, and an instance of the user characteristic, or a user preference, is high level of simplicity. User preferences, such as high, can also be represented using fuzzy sets, as is described below.

The capturing program 211 could take many forms, as would be appreciated by one skilled in the art. The following passage shows one example of processes invoked by the capturing program 211 in an attempt to capture user requirements. The example relates to test result from cancer patients, where, for each patient there are nine results (i.e. cancer attributes, such as clump thickness, uniformity of cell size, uniformity of cell shape etc.) each having possible integer values between 1 and 10, and each case has been pre-classified as being benign or malignant. It is to be understood that the capturing program 211 is not limited to the processes described in this specific example.

Figure 3:
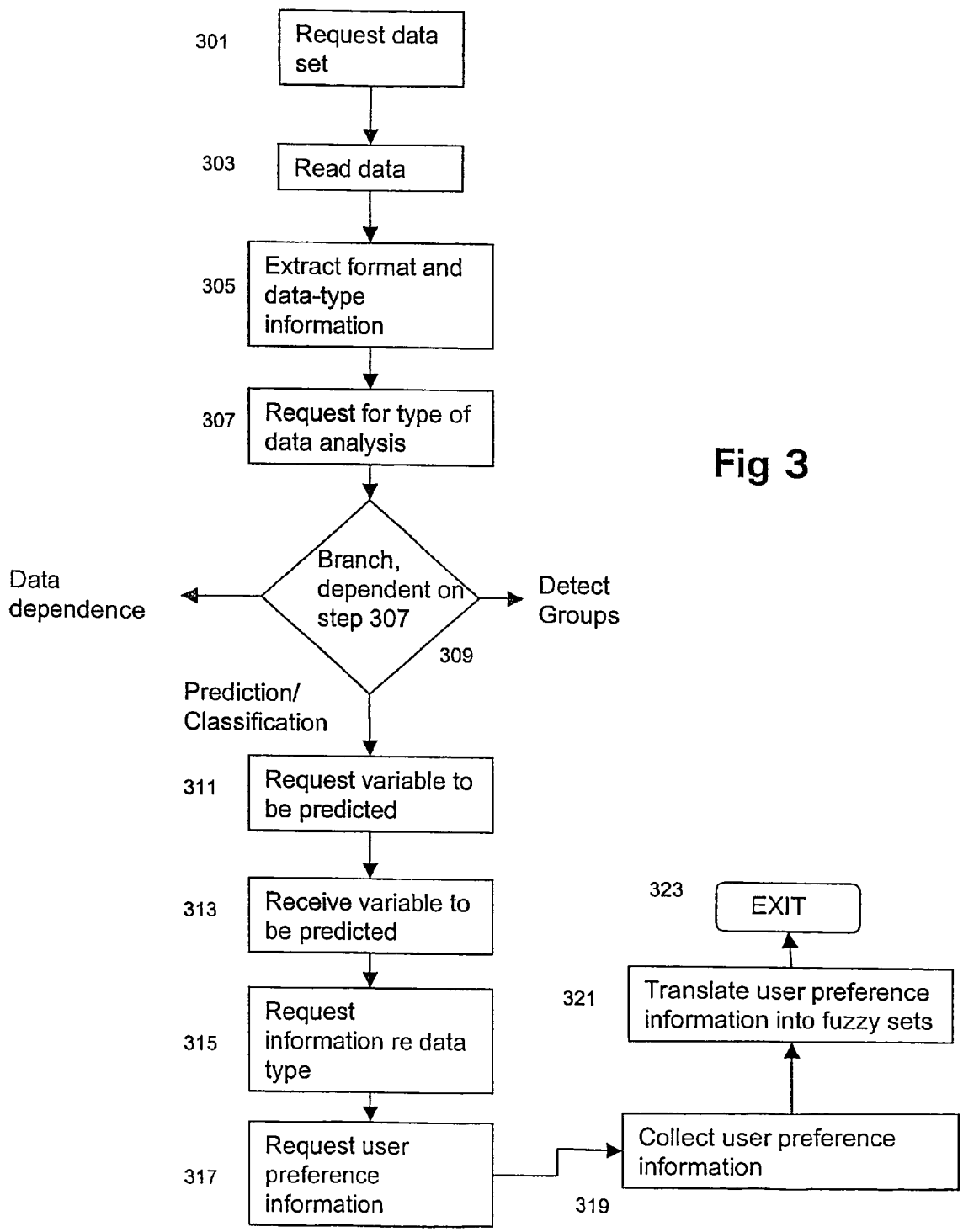
FIG. 3 is a flow diagram showing steps involved in capturing user requirements according to embodiments of the invention.

For the purposes of this example it is assumed that the capturing program 211 is an applet that has, for example, been downloaded from the server computer 20, as shown schematically in FIG. 2. Referring to FIG. 3, the capturing program 211 firstly requests 301 the user to input a data set, whereupon the user duly submits the data. This may be in the form of a data file (e.g. database file, Excel spreadsheet, text file) or a graphical representation (e.g. an image such as an x-ray image).

The capturing program 211 reads 303 in the data, and applies 305 standard techniques to extract format and data type information from the data, in order to identify variables present in the data. If the data is input in the form of a data file, these techniques include searching for white spaces, commas, semi-colons etc. so as to identify a number of variables within the data set (here 10), identifying data types (i.e. integer, real, string) for each of the variables, and identifying any missing values within the data set. An example of identifying data types includes reading a value as a string and trying to transform it into a specific data type. Typically the most specific data type is tried first, followed by the more general ones. A typical sequence is: date/time, boolean, integer, double. If all of the transformations fail, the value is considered to be a string.

Having completed an initial analysis of the data set (step 305), the capturing program 211 asks 307 the user to select a type of data analysis for the data set—e.g. the capturing program 211 presents the user with the following options:

A) Predict the value of one or several variables from the remaining other variables (prediction, approximation, classification)
B) Detect groups within the data (cluster analysis)
C) Describe dependencies within the data (association rules, probabilistic models)

Depending on the selection by the user, the capturing program 211 branches 309 into one of three processes. Assuming (for the purposes of this example) the user selects option (A), the capturing program 211 then asks 311 the user to select, from one of the variables identified at step 305, a variable to be predicted. Assuming the user selects the tenth variable (diagnosis, say) the capturing program 211 receives 313 this selected variable, and then queries 315 the user regarding the nature of the variables identified at step 305.

For example, the capturing program 211 may submit the following question, and options, to the user at step 315:

There are nine input variables. All of them display only integer values. Do you know if the values represent actually symbols or real numbers, i.e. would decimal fractions theoretically be possible?
A) The values represent symbols
B) The values represent genuine numbers
C) I don't know This statement is generated dynamically by the capturing program 211, using information captured at step 305: in general the capturing program 211 may have access to a selection of templates, in which the captured information (nine, integer) is inserted. Selection of template is dependent on branching (step 309), and type of data identified at step 305.

Assuming the user selects option (B) the capturing program 211 then asks 317 the user to select (or specify) instances of user characteristics, by, for example, presenting the user with a matrix of user characteristics, and allowing the user to select an instance thereof. An example of such a matrix, as completed by a user, is shown in Table 1:

TABLE 1

| USER CHARACTERISTICS | Instance of user characteristic | | |
| --- | --- | --- | --- |
|  | High | Low | Medium |
| user friendliness | X | | |
| interpretability | X | | |
| simplicity | X | | |
| accuracy | | | X |
| speed | | X | |
| maintainability | | X | |
| robustness | X | | |

Once user preference information has been collected 319, the capturing program 211 may translate 321 the user preference information into fuzzy sets. For example, high is a fuzzy set, which is represented by a membership function over an artificial scale of 0 to 100. Example membership functions for high could start at 50 with membership degree 0.0, reach membership degree 1.0 at 75 and remain at 1.0 until it reaches 100. In other words, the membership function for high can be described by three characteristic points, which are connected by straight lines: (50, 0.0); (75, 1.0); (100, 1.0). The fuzzy set medium is represented as (25, 0.0), (50, 1.0), (75, 0.0); and the fuzzy set low is represented as (0, 0.0), (25, 1.0), (50, 0.0). It will be understood by one skilled in the art that a fuzzy set could be specified in many alternative formats, for example by two, or four characteristic points, or by a parameterised function.

The capturing program 211 then exits 323.

In general, therefore, the capturing program 211 collects at least some of the following information: type of data analysis (in this example prediction); type of data to be analysed (in this example integer); and user preferences in terms of type of data analysis. Other information, such as identification of variable to be predicted is dependent on user selection (steps 309, 311), and will vary from example to example.

Identifying Program 213

The identifying program 213 receives, as input, information describing the type of data analysis required by the user (e.g. predictive, classification, clustering etc.), together with the user's preferences (e.g. very simple, highly accurate etc., which has already been, or can be, translated e.g. into fuzzy logic sets). This input is typically received from the capturing program 211.

The identifying program 213 is operable to identify, by application of predetermined fuzzy rules, or equivalent, analysis methods (also referred to as models) having characteristics that meet the user's preferences. These rules are stored in the knowledge base KB, and map user characteristic to model characteristic as shown in the following examples:

Rule Format:

IF [instance of user characteristic] then [instance of model characteristic]

e.g. RULE TYPE: SIMPLICITY

If simplicity is high then number of parameters is low

If simplicity is high then skill required is low

These rules are based on the relationships shown in Table 2, which shows a mapping between model characteristics and user characteristics. For example, referring to Table 2, there will be rules relating user friendliness, interpretability, simplicity, accuracy and speed to number of parameters.

TABLE 2

Mapping between model characteristics and user characteristics

| MODEL CHARACTERISTICS | USER CHARACTERISTICS |
| --- | --- |
| Number of parameters | user friendliness, interpretability, simplicity, accuracy, speed |
| Skill required | simplicity, maintainability |
| Level of user interaction | user friendliness, interpretability |
| Adaptability | accuracy, speed, robustness, maintainability |
| Customisability | interpretability, maintainability |
| Modelling capability | Robustness |
| Data required | Speed |
| Prior knowledge required | Interpretability |

Essentially these rules are used to translate user preferences, which, as described above, are themselves represented as fuzzy sets, into fuzzy sets for the model characteristics. The identifying program 213 then compares the said model characteristic fuzzy sets with fuzzy sets representative of actual data analysis methods (shown in Table 3), so as to identify one or more data analysis methods that satisfy the user preferences.

TABLE 3

Mapping between model characteristics and methods

| | DATA ANALYSIS METHODS | | | | | |
| --- | --- | --- | --- | --- | --- | --- |
| | Neural Network | | Linear Regression | | Neuro-fuzzy | |
| MODEL CHARAC'TIX | Natural Language | Fuzzy set | Natural Language | Fuzzy set | Natural Language | Fuzzy set |
| Number of parameters | high | (50, 0.0); (75, 1.0); (100, 1.0) | low | (0, 1.0); (25, 1.0); (50, 0.0) | medium | (25, 0.0); (50, 1.0); (75, 0.0) |
| Skill required | expert | (50, 0.0); (75, 1.0); (100, 1.0) | novice | (0, 1.0); (25, 1.0); (50, 0.0) | casual | (25, 0.0); (50, 1.0); (75, 0.0) |
| Level of user interaction | moderate | (25, 0.0); (50, 1.0); (75, 0.0) | low | (0, 1.0); (25, 1.0); (50, 0.0) | moderate | (25, 0.0); (50, 1.0); (75, 0.0) |

TABLE 3-continued

Mapping between model characteristics and methods

DATA ANALYSIS METHODS

| | Neural Network | | Linear Regression | | Neuro-fuzzy | |
|---|---|---|---|---|---|---|
| MODEL CHARAC'TIX | Natural Language | Fuzzy set | Natural Language | Fuzzy set | Natural Language | Fuzzy set |
| Adaptability | moderate | (25, 0.0); (50, 1.0); (75, 0.0) | low | (0, 0.0); (25, 1.0); (50, 1.0) | high | (50, 0.0); (75, 1.0); (100, 1.0) |
| Customisability | difficult | (0, 1.0) (100, 0.0) | none possible | (0, 1.0) | easy | (0, 0.0) (100, 1.0) |
| Modelling capability | universal | (0, 0.0) (100, 1.0) | restricted | (0, 1.0) (100, 0.0) | universal | (0, 0.0) (100, 1.0) |
| Data required | lots | (0, 0.0) (100, 1.0) | little | (0, 1.0) (100, 0.0) | lots | (0, 0.0) (100, 1.0) |
| Prior knowledge required | prior knowledge impossible | (0, 1.0) (100, 0.0) | prior knowledge impossible | (0, 1.0) (100, 0.0) | prior knowledge possible | (0, 0.0) (100, 1.0) |

Figure 4:
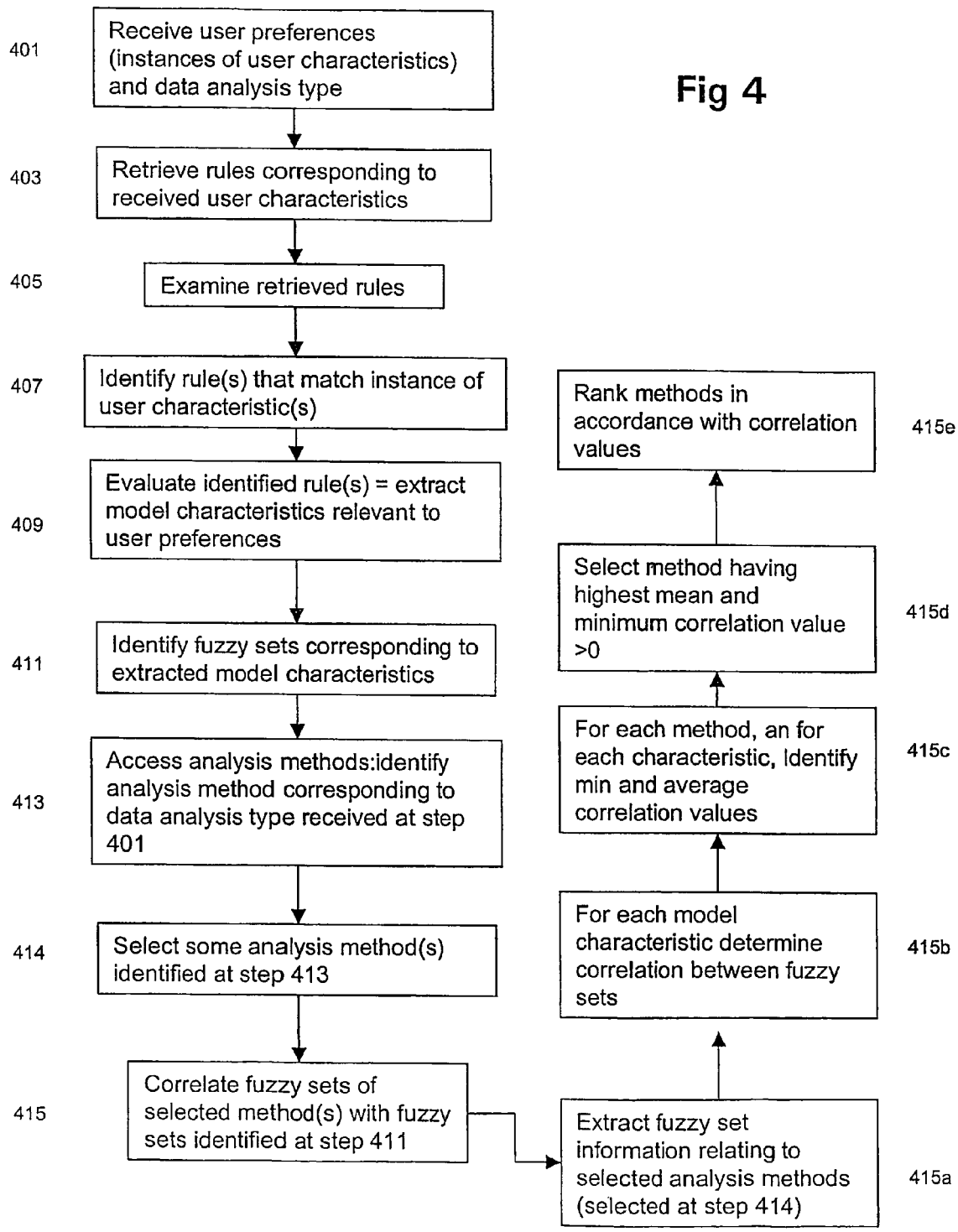
FIG. 4 is a flow diagram showing steps involved in identifying data analysis methods that satisfy user requirements, according to embodiments of the invention.

The functionality of the identifying program 213 is best described by means of an example. Referring to FIG. 4, the identifying program 213 receives 401 user preferences and data analysis type via the capturing program 211. The identifying program 213 then retrieves 403 rules corresponding to user characteristic(s) for which there is a user preference. For the purposes of the present example it is assumed that the user has input a single user preference, of high simplicity, and a predictive data analysis type, so that the identifying program 213 retrieves rules corresponding to the user characteristic simplicity at step 403.

The identifying program 213 then examines 405 the simplicity-type rules, and, by examination of the antecedent part of the rules, identifies 407 one or more rules that match the level of simplicity specified by the user (high) to a degree larger than zero.

Having identified, at step 407, one or more rules corresponding to the user preference, the identifying program 213 evaluates 409 the identified rules. This identifies an instance of, or fuzzy sets corresponding to, one or more model characteristics. In this example there are two rules, and two model characteristics. The first model characteristic is number of parameters, for which the instance of the model characteristic is low (i.e. has a membership function that can be described by three characteristic points, which are connected by straight lines: (0, 0.0); (25, 1.0); (50, 0.0)). The second model characteristic is skill required, for which the instance is novice (i.e. has a membership function that can be described by three characteristic points, which are connected by straight lines: (0, 1.0); (25, 1.0); (50, 0.0)).

The identifying program 213 thus identifies 411 as many fuzzy membership sets as number of model characteristics extracted at step 409 (which in this case is 2).

The identifying program 213 then accesses 413 entries corresponding to at least some analysis methods (e.g. by referring to a look-up table such as Table 4) and identifies 414 methods corresponding to the type of data analysis specified as input from the capturing program 211 at step 401. The knowledge base KB may store this information in the following form:

TABLE 4

| TYPE OF DATA ANALYSIS | Data analysis method |
|---|---|
| Prediction | Neural Network (feedforward), Neuro-Fuzzy, Decision Tree, Linear Regression, Non-linear Regression, Discriminant Analysis, K-Nearest Neighbour, Naive Bayes Classifier, Bayesian Network |
| Clustering | Neural Network (Self-Organising Feature Map), Fuzzy Cluster Analysis, K-Means Clustering |
| Description of Dependencies | Association Rules, Bayesian Network |

Thus if the identifying program 213 receives, at step 401, "prediction" as a type of data analysis, then the identifying program 213 selects 414 all of the methods corresponding to "Prediction". It will be appreciated by one skilled in the art that such a selection is a preferable, but not essential, aspect of the invention.

From the methods selected at step 414, the identifying program 213 then identifies 415 those that have fuzzy membership corresponding to the fuzzy sets identified at step 411 (e.g. by referring to a look-up table such as Table 3). In some embodiments, particularly when there are multiple user preferences, this step 415 involves correlating fuzzy sets of the methods accessed at step 413 with fuzzy sets identified at step 411. (This is described below.)

In the present embodiment, simple pattern matching techniques (including, e.g. inspection) are used to identify those methods that have fuzzy membership corresponding to the fuzzy sets identified at step 411. Referring back to Table 3, it can be seen that the linear regression method and NF methods have low number of parameters and require only novice or casual skills, meaning that both of these methods would suit a user input of "simple model".

In most cases, there will be multiple rules relating user characteristics to model characteristics, and the identifying program 213 will receive user preference information relating to multiple user characteristics. Other embodiments of the invention thus may involve more stages than those described above. For example, assume the user preferences comprise the following:

user friendliness=high; interpretability=high; simplicity=high; accuracy medium; speed=low; maintainability=low; robustness=high, and assume that the knowledge base KB stores, or has access to, the following rules:

If simplicity is high then number of parameters is low [R1]

If accuracy is low and interpretability is high then prior knowledge is possible and model capability is universal [R2]

If maintainability is low then adaptability is low and no customisation [R3]

In this example, the identifying program 213 identifies rules R1 and R3 as being relevant to the user preferences at step 407. Rules R1 and R3 provide a complete match with the user preferences. Rule R2 does not match, because the membership functions high and low for accuracy do not overlap.

Then at step 409 the identifying program 213 evaluates 409 the rules R1 and R3, thereby computing the conclusions of the rules R1, R3. In the present example the conclusions are identical to the consequent part (the "then" part), and model characteristics number parameters, adaptability, customisation are extracted.

Step 411, which identifies degrees of membership of the model characteristics, thus identifies the following three fuzzy sets:

number of parameters=low adaptability=low customisation=none

For the identifying program 213 to correlate 415 these fuzzy sets with data analysis methods selected at step 414, the identifying program 213 firstly extracts 415a fuzzy set information relating to these selected data analysis methods. Referring to table 3, the identifying program 213 thus extracts 415a the following information:

TABLE 5

| FUZZY SETS TO BE MATCHED | Neural Network | Linear Regression | Decision Tree | Neuro-fuzzy |
| --- | --- | --- | --- | --- |
| number of parameters = low (0, 1.0); (25, 1.0); (50, 0.0) | high (50, 0.0); (75, 1.0); (100, 1.0) | low (0, 0.0); (25, 1.0); (50, 1.0) | medium (25, 0.0); (50, 1.0); (75, 1.0) | medium (25, 0.0); (50, 1.0); (75, 1.0) |
| Adaptability = low (0, 1.0); (25, 1.0); (50, 0.0) | moderate (25, 0.0); (50, 1.0); (75, 1.0) | low (0, 0.0); (25, 1.0); (50, 1.0) | low (0, 0.0); (25, 1.0); (50, 1.0) | high (50, 0.0); (75, 1.0); (100, 1.0) |
| Customisation = none (0.0, 0.0) | difficult (0, 1.0); (100, 0.0) | none possible (0, 1.0) | difficult (0, 1.0); (100, 0.0) | easy (0, 0.0); (100, 1.0) |

The identifying program 213 then determines 415b the correlation between the characteristics to be matched and the fuzzy sets corresponding to each of the method types. An equation such as m=sup(min(a(x), b(x))), where m is the degree of match, sup identifies a maximum value over a continuum such as a real interval, and a and b are fuzzy sets, could be used to calculate the correlation between the model characteristics. The equation retrieves the highest membership value from the intersection of two fuzzy sets and must be evaluated for all values of the underlying scale (in this case between 0 and 100 in all cases). If the fuzzy sets are identical m=1.0; if the fuzzy sets do not overlap at all m=0.0.

TABLE 6

| | Correlation between fuzzy sets | | | |
| --- | --- | --- | --- | --- |
| Model characteristics to be matched | Neural Network | Linear Regression | Decision Tree | Neuro-fuzzy |
| number of parameters | 0.0 | 1.0 | 0.5 | 0.5 |
| adaptability | 0.5 | 1.0 | 1.0 | 0.0 |
| customisation | 1.0 | 1.0 | 1.0 | 0.0 |

Next the identifying program 213 identifies 415c minimum and average correlation values for each of the methods:

TABLE 7

| | Neural Network | Linear Regression | Decision Tree | Neuro-fuzzy |
| --- | --- | --- | --- | --- |
| Min correlation | 0.0 | 1.0 | 0.5 | 0.0 |
| Mean correlation | 0.75 | 1.0 | 0.83 | 0.16 | and selects 415d whichever method has both the highest mean, and a minimum correlation greater than 0. In the present example the method linear regression would be selected because it has the highest mean and the minimum correlation value is greater than 0 (in fact both values are 1.0, indicating that this method matches user requirements exactly). In addition, the identifying program 213 can rank 415e the methods in accordance with the mean and minimum correlation values. This ranking indicates how well the methods are estimated to match the user requirements.

In the above example, each of the three model characteristics extracted at step 409 occurs once only. However, there may be situations where more than one rule identified at step 407 involves the same model characteristic. For example, referring to FIG. 5, if the user's preferences received at step 401 were for a simple model 501 (i.e. simplicity=high), where maintainability thereof is medium 503, then rules identified at step 407 may include If simplicity is high then number of parameters is low [R1]

If maintainability is medium then number parameters is medium [R2]

Thus step 411, which involves identifying fuzzy sets for the model characteristics, based on the consequent parts of rules R1 and R2, additionally involves combining 411a (step not shown) low and medium to identify a fuzzy set for number of parameters.

Figure 5:
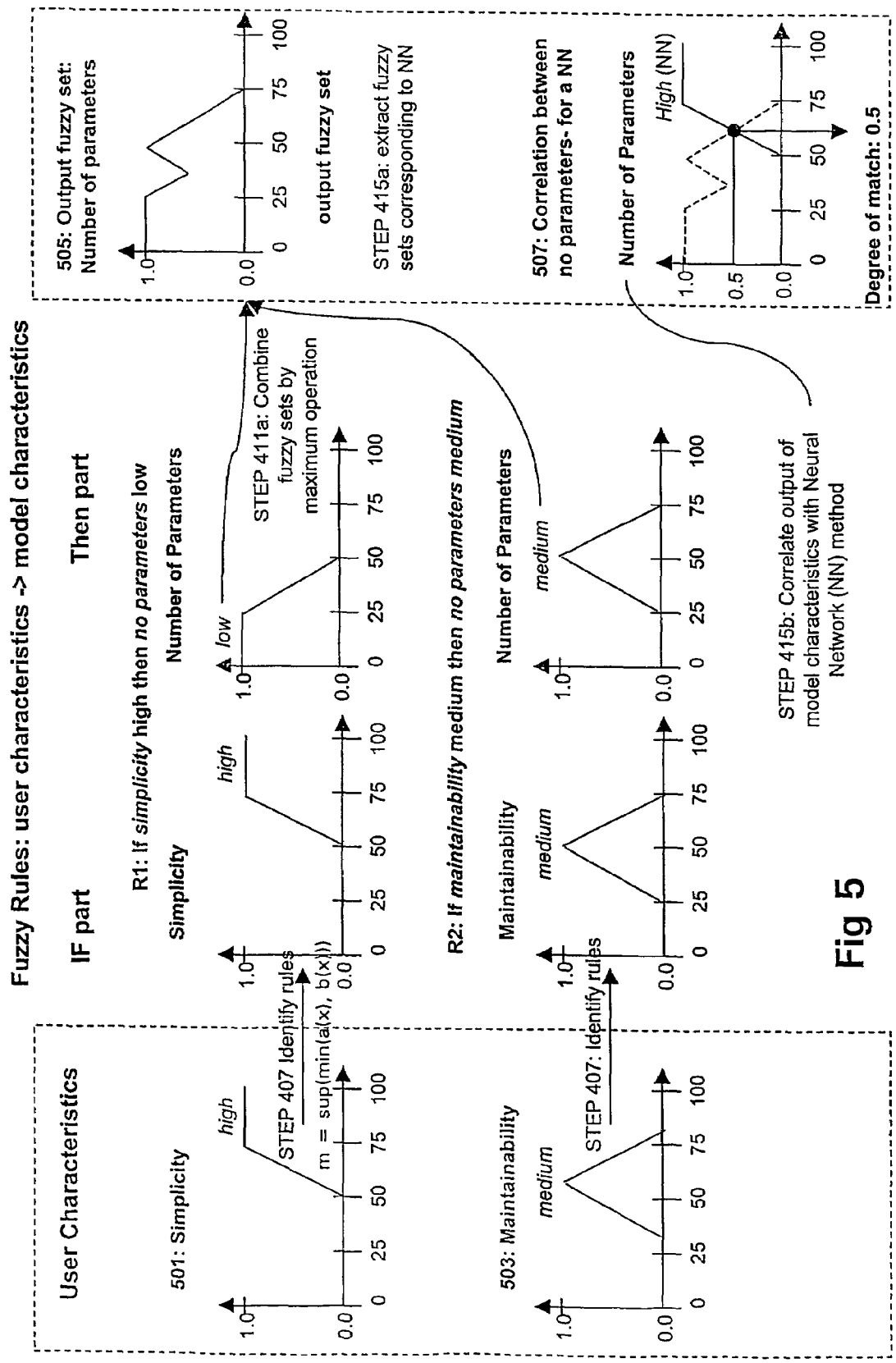
FIG. 5 is a flow diagram showing further aspects of identifying data analysis methods that satisfy user requirements, according to embodiments of the invention.

An example of how these two model instances, low and medium, may be combined is shown in FIG. 5. In this example, the equation c(x)=max(a(x), b(x)), is applied (where a(x) and b(x) are low and medium fuzzy sets respectively and c(x) represent the combined fuzzy set). This produces an output fuzzy set 505 for number of parameters.

Steps 415a, 415b and 415c proceed as described above. For a neural network method, and it can be seen that correlation 507 between user requirements and the method Neural Network for the model characteristic number of parameters is 0.5.

Adaptability of Identifying Program 213

It could be that none of the methods identified at step at step 413 have a minimum correlation value greater than 0. Such situations may arise if, for example, the user preferences are strict or crisp (e.g. if the user specifies that he wants a specific type of model, e.g. a rule-based model. This means that the identifying program 213 is constrained to select a specific method at step 414, for which model characteristics such as customisation are crisp (for rule-based models, customisation=none, where the fuzzy set for none is just a singleton (0.0, 1.0)).

In such cases, the rule output fuzzy sets can be amended by an "at least" operation. For example, in the case of the model characteristic customisation the result customisation=none can be replaced by "at least none", thereby effectively extending the rule conclusions. This has the effect of increasing the likelihood that at least one method will satisfy the conditions applied at step 415d (step 415d: identify method having highest mean correlation and minimum correlation greater than 0).

In terms of fuzzy set notation, this "at least" is represented as:

a≧(larger or equal) symbol so that a fuzzy set A≧(A) is defined as follows:

≧(A)=A' with a'(x)=1.0 if x>$A_{[1.0]}$, where $A_{[1.01]}$ is defined as the smallest x such that A(x)=1.0.

In addition to forcing the identifying program 213 to identify at least one method in situations where minimum correlation is zero for all methods identified at step 414, rules could be similarly modified if only a single method can be identified, and the intention (e.g. specified by the user) is to evaluate results from two or more suitable methods.

Assuming that rule R3 is identified at step 407

If maintainability is low then adaptability is low and no customisation [R3]

then, when the rule is evaluated at step 409, the fuzzy set for "no customisation" is replaced by "at least no customisation", and the fuzzy set for "low adaptability" is replaced by "at least low adaptability", so that the following fuzzy sets are generated:

adaptability=(0, 0.0) (25, 1.0) (100, 1.0)
customisation=(0,1.0) (100,1.0)

Clearly when, at step 415b, such fuzzy sets are correlated with fuzzy sets of methods identified at step 414, application of equation m=sup(min(a(x), b(x))) is likely to generate non-zero minimum correlations (values of m).

Pre-Processing Program 217

Data pre-processing is a process whereby data is processed prior to input to one or more data analysis methods. Typically, data pre-processing includes at least some of: detecting and removing outliers and anomalies from the data; analysis of the pattern of missing values in the data; variable selection; and sampling of the data. Different analysis methods have different requirements relating to data format, scaling, and sampling etc, so that the pre-processing program 217 selects and automatically applies appropriate pre-processing methods depending on the data, the goal of the analysis, and the methods that are selected to analyse the data.

In at least some embodiments of the invention, the pre-processing program 217 receives input from the capturing program 211. This input includes the data set to be analysed, together with information indicative of type of data and number of variables, and the type of data analysis to be performed on the data set (e.g. prediction, classification etc.).

Figure 6:
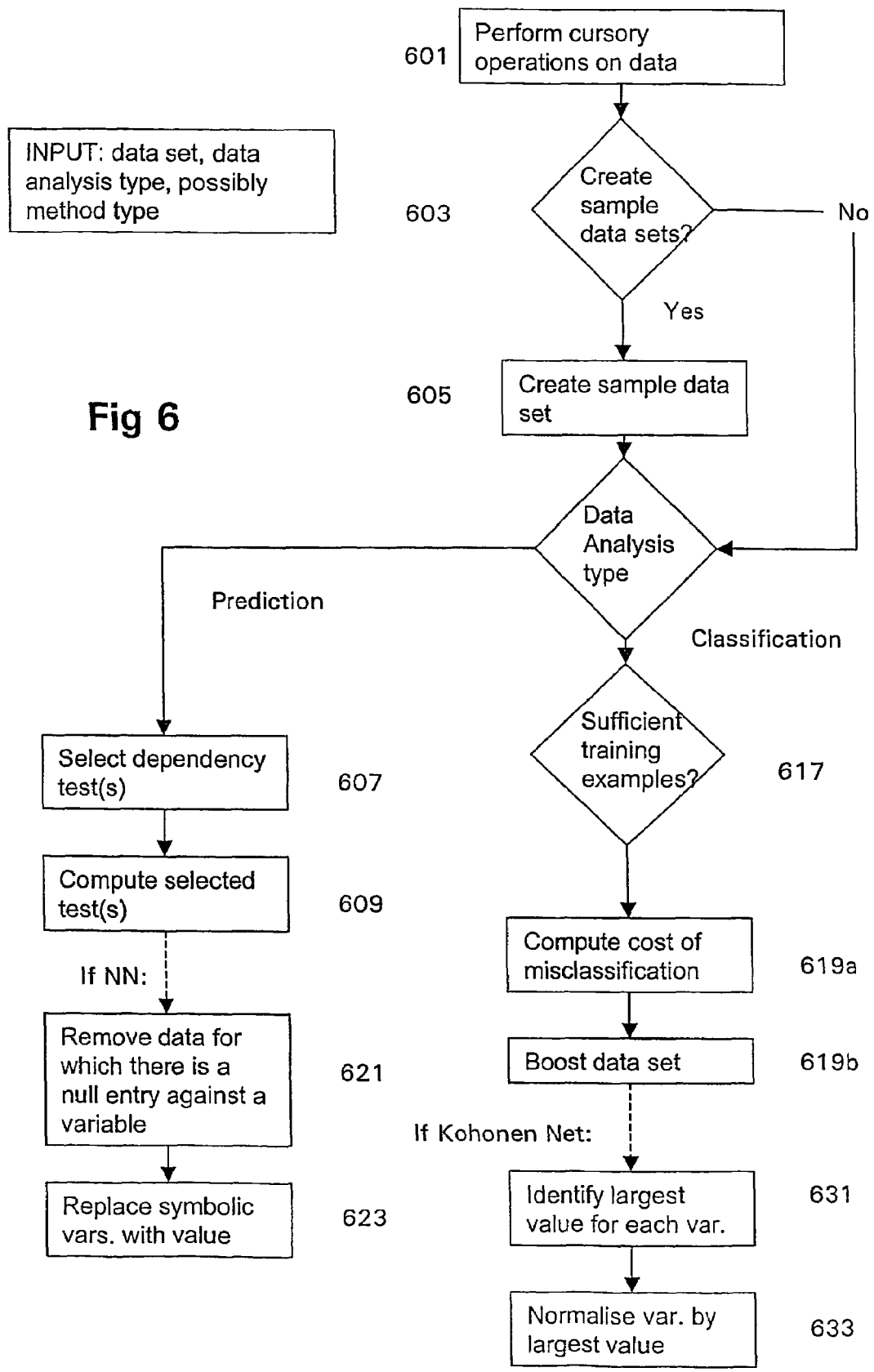
FIG. 6 is a flow diagram showing steps involved in pre-processing of data, according to embodiments of the invention.

This input enables the pre-processing program 217 to perform several data manipulation steps. The actual steps carried out vary in accordance with the type of data analysis requested by the user, and on the form of the data to be utilised. FIG. 6 shows several possible pre-processing operations, not all of which will be performed for all cases. In fact, running of the pre-processing program 217 is not essential to the invention; in some cases the data may be sufficiently "clean", and in a format suitable for data analysis.

Referring to FIG. 6, the pre-processing program 217 performs 601 some cursory operations such as identifying missing values in the data set, identifying which of the data should be used for the analysis (e.g. removing constants and identifiers such as strings or increasing integers) and computing statistical information such as mean, variance etc. Then the pre-processing program 217 determines 603, from the size of the data set, whether it needs to create sample data sets. If it does, then at step 605 the pre-processing program 217 accordingly creates sample data sets.

Depending on the type of data analysis to be performed on the data (received at step 401) the pre-processing program 217 then performs some type-dependent processing steps.

For example, if the data analysis type is prediction, the pre-processing program 217 selects 607 one or more dependency tests in order to identify which variables should be used for the data analysis. The selection of dependency tests is dependent on the data type (again, this information is received at step 401), and the pre-processing program 217 selects from tests such as correlations, chi-square tests etc. Having selected appropriate tests, the pre-processing program 217 computes 609 the selected tests.

If the data analysis type is classification, the pre-processing program 217 determines 617 whether or not it has sufficient training examples of each classification type. If there are insufficient training examples of a particular type (e.g. if there are 3 classes, and, within the data set, the data is spread 45% to class 1, 45% to class 2 and 10% to class 3, so that there is an insufficient number of data of class 3), the pre-processing program 217 can equalise the distribution of data among the classes. Accordingly pre-processing program 217 computes 619a, for each class, a cost for misclassification (e.g. from the class frequencies) and/or boosts 619b the class frequency by adding a certain number of data copies to class 3, or deletes a corresponding number of data from classes 1 and 2 to equalise the class frequencies.

The pre-processing program 217 may have received an input, which is indicative of whichever data analysis method has been identified to be most suitable to the user's requirements, from the identifying program 213. Accordingly the pre-processing program 217 may perform additional method-dependent processing of the data.

For example, if the identifying program 213 identifies, at step 415d, a neural network (NN) to be most suited to the user's preferences, the pre-processing program 217 performs the following operations on the data set (sample data set or whole data set, according to decision at step 603): remove 621 any item of data for which there is null entry against one or more variables, or replace null entries by suitable statistical values; encode 623 any symbolic variable by a 1-from-n code, where n depends on the number of different values of the variable.

Alternatively, if the identifying program 213 identifies, at step 415d, a Kohonen net to be most suited to the user's preference, the pre-processing program 217 identifies 631 the largest values of all variables in the data set and normalises 633 all variables by the identified largest value.

Model Building Program 215

Once the identifying program 213 has identified one or more data analysis methods, the building program 215 accesses a second knowledge base KB2 (which may be part of, or located remote from (as shown in FIG. 2), the knowledge base KB) to create (a) model(s) using the identified methods.

In general a data analysis method creates a model using data. Thus the building program 215 receives the data set input to the capturing program 211 (or, if the data set has been pre-processed by the pre-processing program 217, from the pre-processing program 217), and this data set is used by the identified methods (e.g. during learning to create a model, or to learn classification rules etc.).

Figure 7:
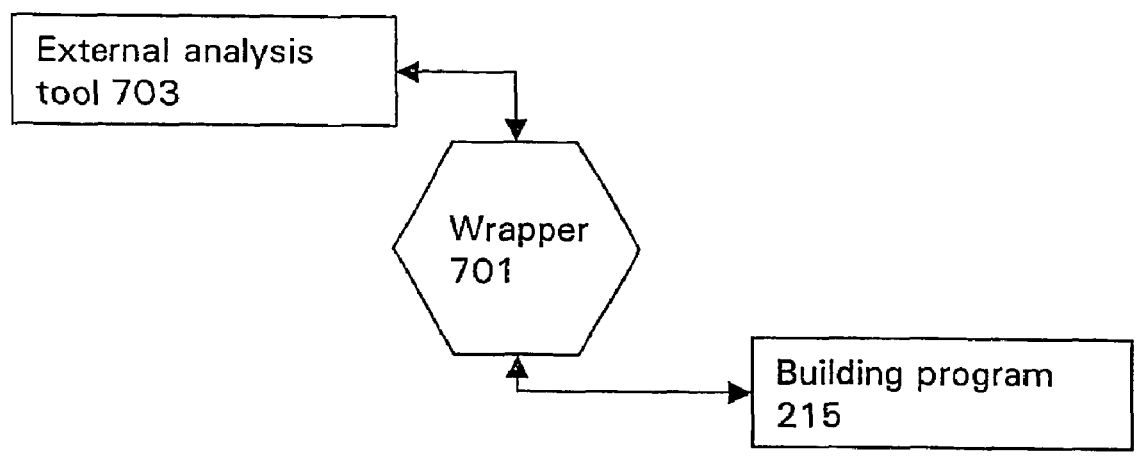
FIG. 7 is a schematic diagram illustrating relationship of a wrapper program and an external analysis tool, according to embodiments of the invention.

The building program 215 has access to standard, and purpose-built, analysis tools that carry out the identified methods. The building program 215 interoperates with the standard analysis tools via wrappers 701, as shown in FIG. 7. As is known in the art, a wrapper 701 is a piece of software that interfaces between an external tool 703 and the building program 215; essentially each wrapper 701 is associated with an external tool and translates information between the building program 215 and its associated tool 703, so that the tool 703 can be executed in accordance with instructions from the building program 215.

As stated above, each tool can carry out a particular data analysis method. For example, in embodiments of the invention the following external tools are utilised:

TABLE 8

| METHOD | DETAILS |
|---|---|
| Decision trees | "DT Package", which is available under the Gnu Public License from the University of Magdeburg, author Christian Borgelt, described in "Attributauswahlmaβe für die Induktion von Entscheidungsbäumen: Ein Überblick", Christian Borgelt und Rudolf Kruse.In: Gholamreza Nakhaeizadeh, ed. Data Mining: Theoretische Aspekte und Anwendungen, pp. 77-98. Physica-Verlag, Heidelberg, Germany 1998. The software is available (for downloading) from http://fuzzy.cs.Uni-Magdeburg.de/~borgelt/software.html |
| Neuro-fuzzy methods | NEFCLASS: "Obtaining Interpretable Fuzzy Classification Rules from Medical Data", Detlef Nauck and Rudolf Kruse, Artificial Intelligence in Medicine, 16:149-169, 1999. NEFPROX; "Neuro-Fuzzy Systems for Function Approximation", Detlef Nauck and Rudolf Kruse, Fuzzy Sets and Systems, 101:261-271, 1999. |
| Statistical Methods | SPSS "SPSS 10.0 Guide to Data Analysis", Marija J. Norusis, Prentice Hall, 2000, ISBN: 0130292044; Statistica: "Statistica Software", Statsoft, International Thomson Publishers, 1997, ISBN: 0213097732 |

Figure 8:
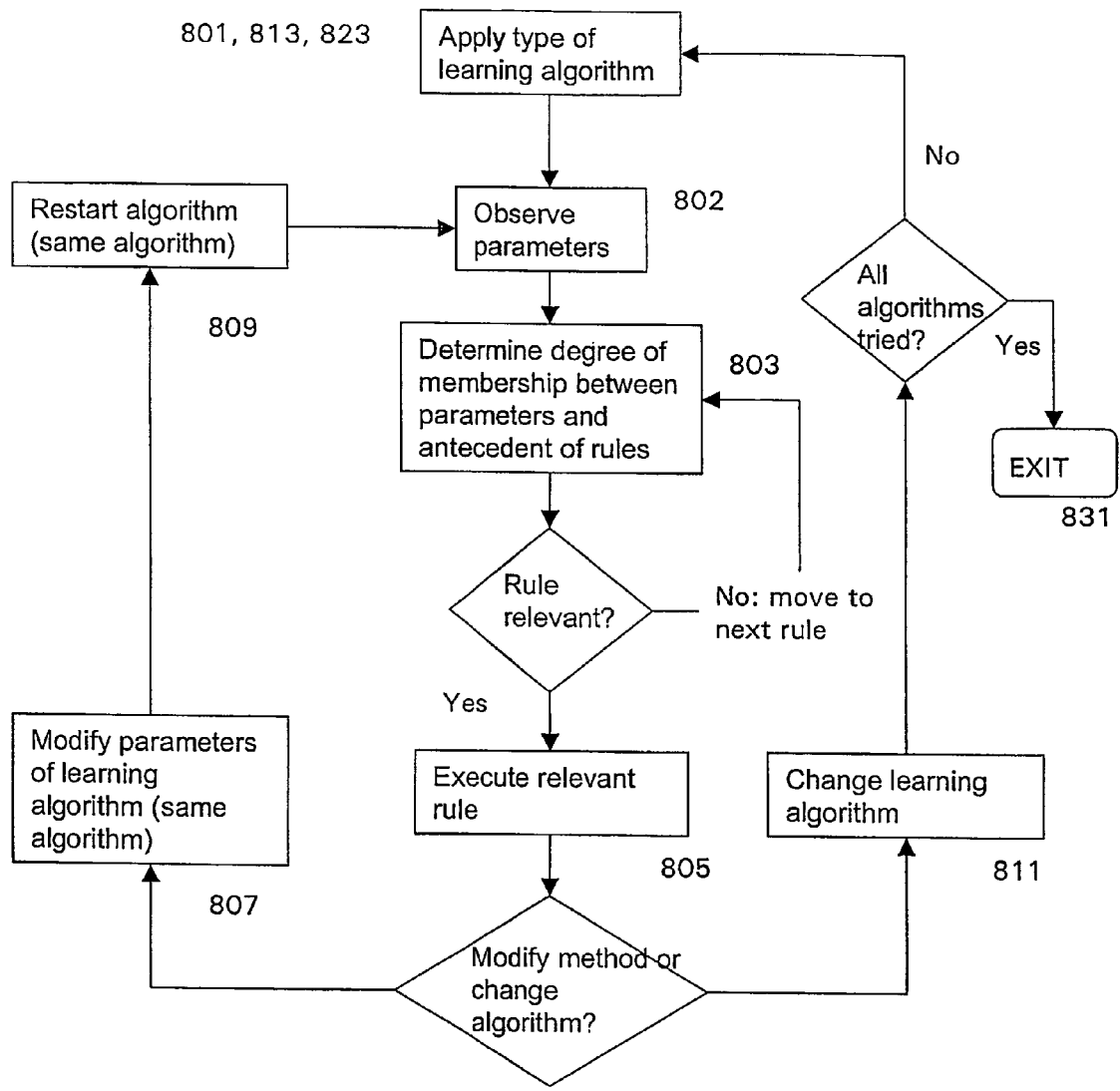
FIG. 8 is a flow diagram showing steps involved in building a model in accordance with one or more data analysis methods identified in embodiments of the invention.

The instructions, which control execution of the tool, are stored in the second knowledge base KB2, and essentially comprise heuristics, in the form of exact and fuzzy rules. These heuristics define the learning process required for model creation. The rules are method-specific, e.g. for Method type NEURAL NETWORK, which is a bespoke tool for generating a neural network, there are three possible learning algorithms: backpropagation (BackProp), quick-propagation (QuickProp) and resilient propagation (Rprop), and the selection and processing of the learning algorithms involve the following steps (referring to FIG. 8):

Apply Rprop first 801.

If Rprop fails apply QuickProp 813

If QuickProp fails apply BackProp 823

If BackProp fails, then abort 831 neural network generation

During execution of the learning algorithms, the building program 215 observes parameters such as oscillation, error, convergence speed, number of parameters etc. (as they are inherent features of the learning/analysis/model creation algorithms), and compares these against predetermined fuzzy learning rules [RRn], such as:

If the error reaches a high local minimum early, then repeat the current learning algorithm using slightly more hidden units. [RR1]

If the error oscillates strongly, then reduce the learning rate strongly [RR2]

If the error decreases, then increase the learning rate slightly. [RR3]

As illustrated above, typically several algorithms are available for creating the same kind of model. In the present example, that of creating a neural network model, there are three such algorithms: Rprop, QuickProp and BackProp. Each algorithm yields a certain performance feature, so that for example, a first algorithm may have a faster convergence speed than a second algorithm, but it may be prone to oscillations. Thus if a faster learning rate were required, the first algorithm would be selected to build the model. If, however, oscillations occur, it may be necessary to switch to the slower algorithms to avoid oscillations. These algorithms may not only differ in computational complexity, speed of convergence, and ease of parameterisation, but also in the way they ensure certain features appear/evolve in the model they create from data.

Accordingly, during the model learning/creation process, the building program 215 observes 802 at least some of the parameters listed above. Then the building program 215 determines 803 a degree of membership of the parameters to the fuzzy learning sets in the antecedent of the fuzzy learning rules listed above, in order to determine whether the learning rule is relevant, and thus whether a learning rule should be executed. If a learning rule is relevant, the building program 215 executes 805 the said rule.

For example, considering the learning rules listed above, if the fuzzy learning set for error satisfies rule RR1 then the building program 215 changes 807 the number of parameters of the neural network to add more hidden units, and restarts 809 the algorithm. If any of the algorithms fail, the building program 215 changes 811 the algorithm—to apply one of the other learning algorithms.

Considering a second example, a Neuro-fuzzy method, where the first stage is rule learning, the second knowledge base KB2 contains fuzzy learning rules of the following format:

If simplicity is high and interpretability is high, and number of rules is high, then reduce the number of fuzzy sets per variable slightly and restart [RR4]

Thus if the building program 215 observes, at step 803, a huge number of rules being created, (i.e. if rule [RR4] is satisfied), then the building program 215 changes 807 the number of fuzzy sets per variable of the neuro-fuzzy model, and restarts 809 the algorithm.

The building program 215 can be arranged to evaluate, during construction of a model, at least some of the model characteristics, and to compare them with fuzzy set(s) generated at step 411.

For example, consider a neuro-fuzzy method under construction. The building program 215 is adapted to evaluate, using one or more predetermined rules, a number of parameters for the said model under construction, and to compare the evaluated number with the fuzzy set for number of parameters evaluated at step 411. Typically, these predetermined rules would be stored in the second knowledge base KB2, and could have the following form:

$$\text{Number of parameters} = \frac{\text{number of rules in the neuro} - \text{fuzzy model under construction}}{\text{Max no rules}}$$

$$\text{Max no. rules} = (\text{Number of fuzzy sets})^{No\ variables}$$

e.g. if number of variables=3, and there are 5 fuzzy sets/variable, then max number of rules=$5^3$=125;

if the number of rules characterising the neuro-fuzzy method under construction=32, then Number of parameters=32/125=25.6.

This is a non-dimensional number, which maps directly onto the fuzzy set scale [0 . . . 100], and thus enables comparison of the actual number of parameters for this method under construction (or to be constructed/having been constructed) with the fuzzy set evaluated at step 411.

Adaptability of Fuzzy Rules in the Second Knowledge Base KB2 by Building Program 215

As will be appreciated from the above description, data analysis and model creation are heavily dependent on the fuzzy learning sets in the learning rules: firstly, for a learning rule to be considered relevant (step 803), the antecedent fuzzy learning set has to overlap with the method parameters; secondly, the effect of the learning rule, or the degree to which an algorithm is modified (step 807), is dependent on the consequent fuzzy learning set.

Embodiments of the invention thus include means by which the building program 215 monitors the performance of these fuzzy learning rules, and can adapt the learning rules (e.g. by modifying the fuzzy learning sets defining the learning rules), based on the "success" rate thereof. This means could be a neuro-fuzzy algorithm. As is known in the art, neuro-fuzzy algorithms modify fuzzy rules by adapting antecedent and consequent fuzzy sets in accordance with observed data. A neuro-fuzzy algorithm such as the NEFPROX fuzzy rule-learning algorithm, referred to above, could be used.

Application of a neuro-fuzzy algorithm can be demonstrated using rule RR2 above as an example:

If the error oscillates strongly, then reduce the learning rate slightly [RR2]

In rule RR2, oscillate strongly and reduce slightly are represented by fuzzy learning sets. A predefined goal of this rule could be to reduce the oscillation to zero after n steps (say n=10). Assuming the error satisfies the antecedent of this rule, rule RR2 is applied (step 807) and the learning algorithm is continued with a smaller learning rate (step 809).

If, after 10 such cycles of the learning algorithm, the oscillation is not zero, the building program 215 concludes that the consequent part of the rule is too weak, and sets the oscillation value to be an error value.

The building program 215 then modifies, using a neuro-fuzzy learning algorithm and the error value, the consequent part of this fuzzy learning rule (the fuzzy learning set "slightly") so that next time the rule is applied, the degree of reduction applied to the learning rate is greater. In the same way the antecedent part (the fuzzy learning set strongly) can be modified such that the fuzzy learning rule produces a larger degree of fulfillment in future similar situations. For each rule RRn, the parameters—in this case the oscillation—that can be interpreted as error values are identified to the building program 215. These error values are then utilised to modify fuzzy learning rules as described above.

Model Verification and Application Generation

As described above, in the context of the identifying program 213, more than one method may be identified as relevant to the user's preferences, so that the building program 215 builds more than one model.

Information relating to the model(s) is/are presented to the user, preferably via the capturing program 211. In the first instance the building program 215 sends performance-related data to the capturing program 211 as part of a "reporting session" to the user. The user can view information about the model itself by clicking on a button displayed by the capturing program 211, such as "Tell me more . . . " Successive clicking on the "Tell me more" button has the effect of successively "drilling" down to access and view further details of the model(s).

For example, if the building program 215 has built a model using a neuro-fuzzy method, then when the user clicks on the "Tell me more . . . " button, the capturing program 211 would provide the following information:

"Tell me more"
The capturing program 211 states that the model comprises a neuro-fuzzy model having 10 rules;

"Tell me more"
The capturing program 211 shows the rules in a text form;

"Tell me more"
The capturing program 211 displays the fuzzy sets graphically.

In the case of a neural network (NN) method, the following information is displayed in response to the user clicking on the "Tell me more" button:

"Tell me more"
The capturing program 211 states that the model comprises a NN model having x number of units;

"Tell me more"
The capturing program 211 displays the learning algorithm used;

"Tell me more"
The capturing program 211 displays the activation functions used;

"Tell me more"
The capturing program 211 displays the weights computed.

This information is organized by the building program 215 after the model(s) has/have been built, and is either wholly communicated to the capturing program 211 prior to the reporting session or retrieved by the capturing program 211 in response to the user clicking on the "Tell me more" button.

Once a model has been selected—either by the user, (e.g. via the capturing program 211), or automatically by the building program 215, it creates an application based on the model. This application is a standalone program, and comprises program code required to execute the created model. The application can access the same kind of data source that the user has submitted for analysis, e.g. data in a database, a text file or an Excel spread sheet. The user can then use that application to process new data and perform predictions, classifications etc. The application typically has a simple user interface that asks the user for a data source and displays the results of the model application, e.g. in form of table, where the result for each record is shown. It also creates an output file that contains the results.

Monitoring Program 219

In the foregoing description, the data analyser 200 operates in accordance with the following assumptions:
1. that a user's understanding of a user preference (e.g. low) is the same as the data analyser 200 definition of low;
2. that instances of user/model characteristics have the same meaning for all users (e.g. fuzzy set for "low" is the same for all users); and
3. that user characteristics map to model characteristics in the same way for all users.

For each preference category (low, medium, high) user interpretation of the preference category is likely to be normally distributed around the definitions utilised by the data analyser 200 (e.g. low=(0,0.0) (25,1.0) (50,0.0)). Thus, for the majority of users, results generated by the data analyser 200, when generated in accordance with the above assumptions, are likely to be at least satisfactory.

While such results are satisfactory, it is preferable to modify embodiments of the data analyser 200 to include means for individual definition of these preference categories. Thus embodiments may include a program 219 for monitoring user feedback to the model data, and for modifying the fuzzy set definition of terms low, medium, high in accordance with the feedback.

As this modification is user-specific, any modification to the definition of a fuzzy set is stored as a function of the user. A suitable way of storing specific user definitions of the fuzzy sets is via user profiles.

Such feedback may be captured when model results are presented to the user via the capturing program 211. As described above, the capturing program 211 may additionally include means for the user to specify whether or not the model concords with user requirements. This means may be an edit box, or a graphical slide-means, which allows the user to specify whether, for example, the model created is too complex, not sufficiently interpretable, not sufficiently accurate etc.

Figure 9A:
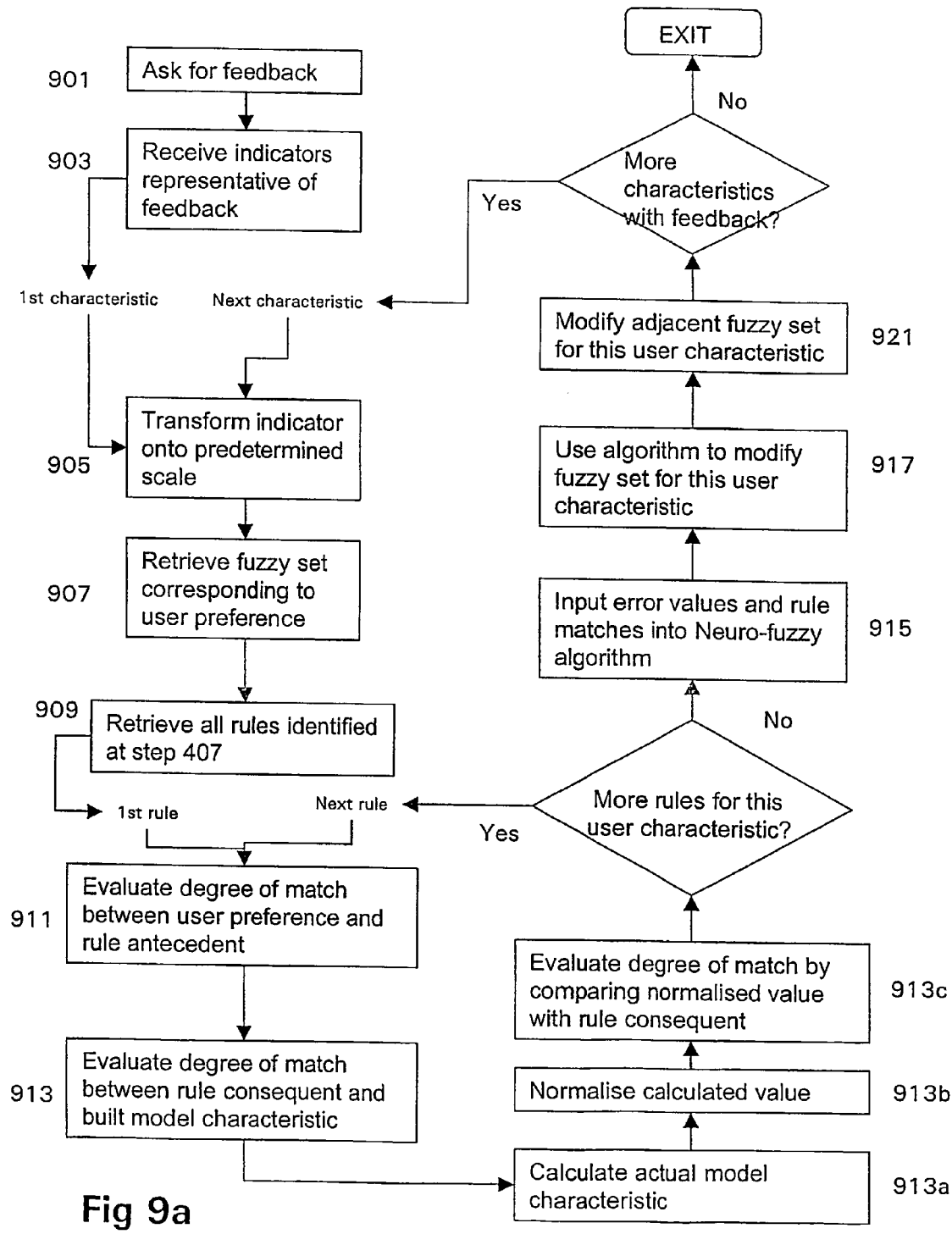
FIG. 9a is a flow diagram showing steps involved in gathering and applying user feedback to customise user preferences, according to a first embodiment.

Referring to FIG. 9a, and in a first embodiment, the monitoring program 219 asks 901 the user for feedback relating to specific user characteristics. Assuming the capturing program 211 includes a graphical slider, the user can move the slider to express how closely the model information (presented by the building program 215, as described above) matches his requirements. For example, for the user characteristic simple, such a slider could be moved between "far too simple-too simple-exactly right-too complex-far too complex"

The monitoring program 219 receives 903 an indicator representative of the user feedback, and transforms 905 the indicator into a number between −1 and +1. For example, assuming that the user sets the slider position to "too simple", which means that the user is has some experience with these methods (i.e. what is categorised as being simple to most users is too simple for this user), then at step 905 the monitoring program 219 translates the slider position to a numerical error value of −0.6.

The monitoring program 219 then retrieves 907 the fuzzy set corresponding to the user preference simple, which was collected by the capturing program 211 at step 319, for use in modifying the fuzzy set for high (for user characteristic simple). The sign of the error transformed at step 905 indicates whether the fuzzy set should be extended to lower values (negative error values), or towards higher values (positive error values). In the present example, for which the error value is −0.6, this indicates that the fuzzy set for high should be extended towards lower values.

Accordingly the monitoring program 219 retrieves 909 all of the rules identified as step 407, corresponding to user characteristic simple. Recalling the example rules used above, in the context of the identifying program 213:

If simplicity is high then number of parameters is low

If simplicity is high then skill required is low

For each rule, the monitoring program 219 evaluates 911 the degree of match between user preference (high) and the rule antecedent (default fuzzy set for high). For the sake of this example, we assume that the fuzzy sets have not previously been modified (so that the user definition of fuzzy set for high=default fuzzy set for high).

For each rule, the modifying means 219 then evaluates 913a degree of match between the rule consequent fuzzy sets and the model characteristics of the built model. The steps involved in this evaluation are best illustrated by the example of model characteristic number of parameters: the number of parameters actually generated for the model built by the building program 215 is calculated 913a (assuming, for the sake of clarity, that only one model is built); the number calculated at step 913a is normalised 913b (as described in the neuro-fuzzy example above); and a degree of match between the evaluated number of parameters and the default fuzzy set for low is calculated 913c.

The monitoring program 219 then repeats step 913 (913a, 913b, 913c) for the second rule (relating to model characteristic skill required), and calculates a second error value relating to user characteristic simple. The monitoring program 219 then inputs 915 both the error values, both antecedent degrees of match evaluated at step 911 and both degrees of match evaluated at step 913, into a Neuro-fuzzy learning algorithm, and, in a known manner, uses 917 the algorithm to modify the fuzzy set corresponding to high for user characteristic simple.

Having modified, at step 917, the fuzzy set corresponding to high for the user characteristic simple, the monitoring program 219 modifies 919 the adjacent fuzzy set, (in this case medium), to account for any overlap between high and medium.

Figure 9B:
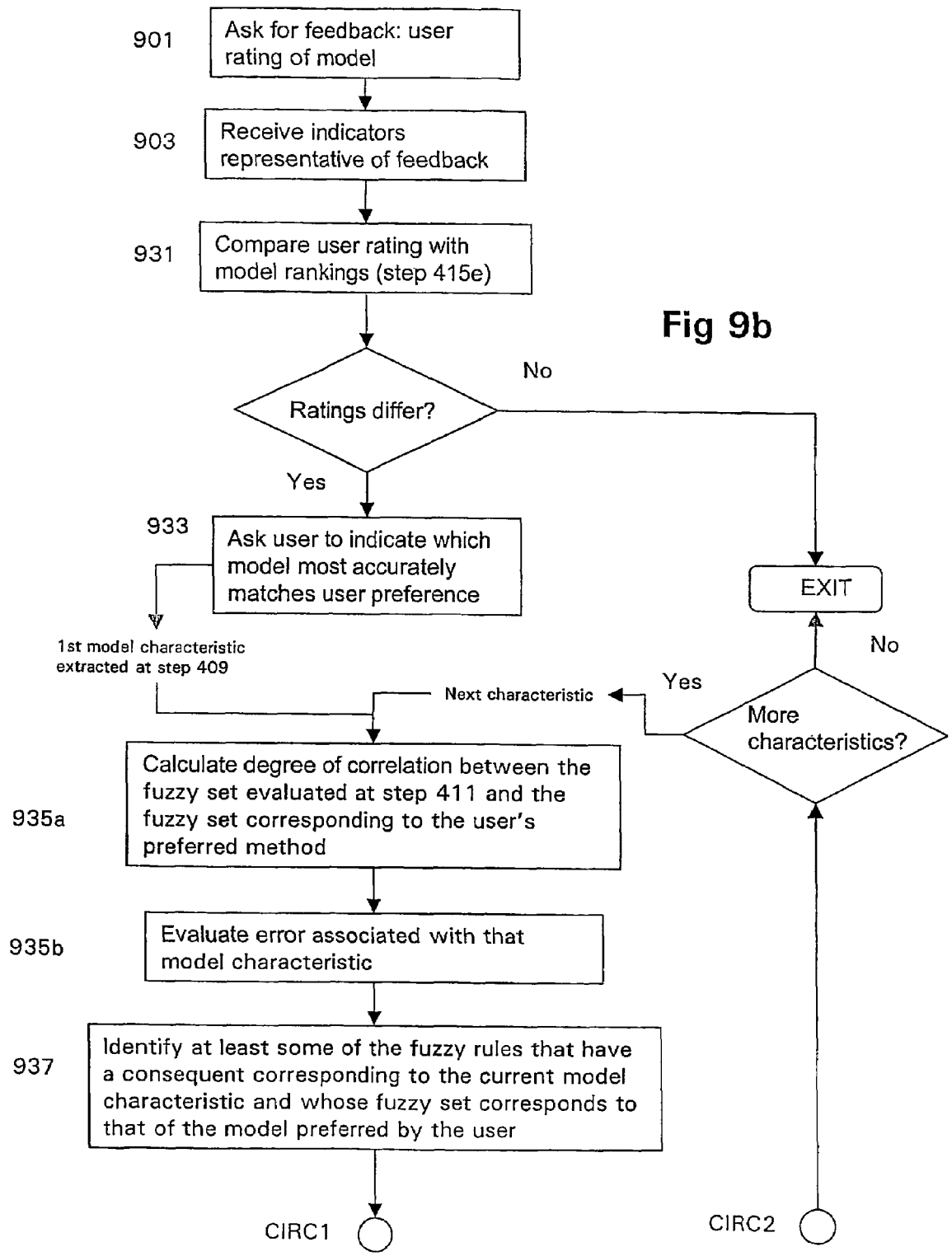
FIG. 9b is a flow diagram showing steps involved in gathering and applying user feedback to customise user preferences, according to a second embodiment.
Figure 9B:
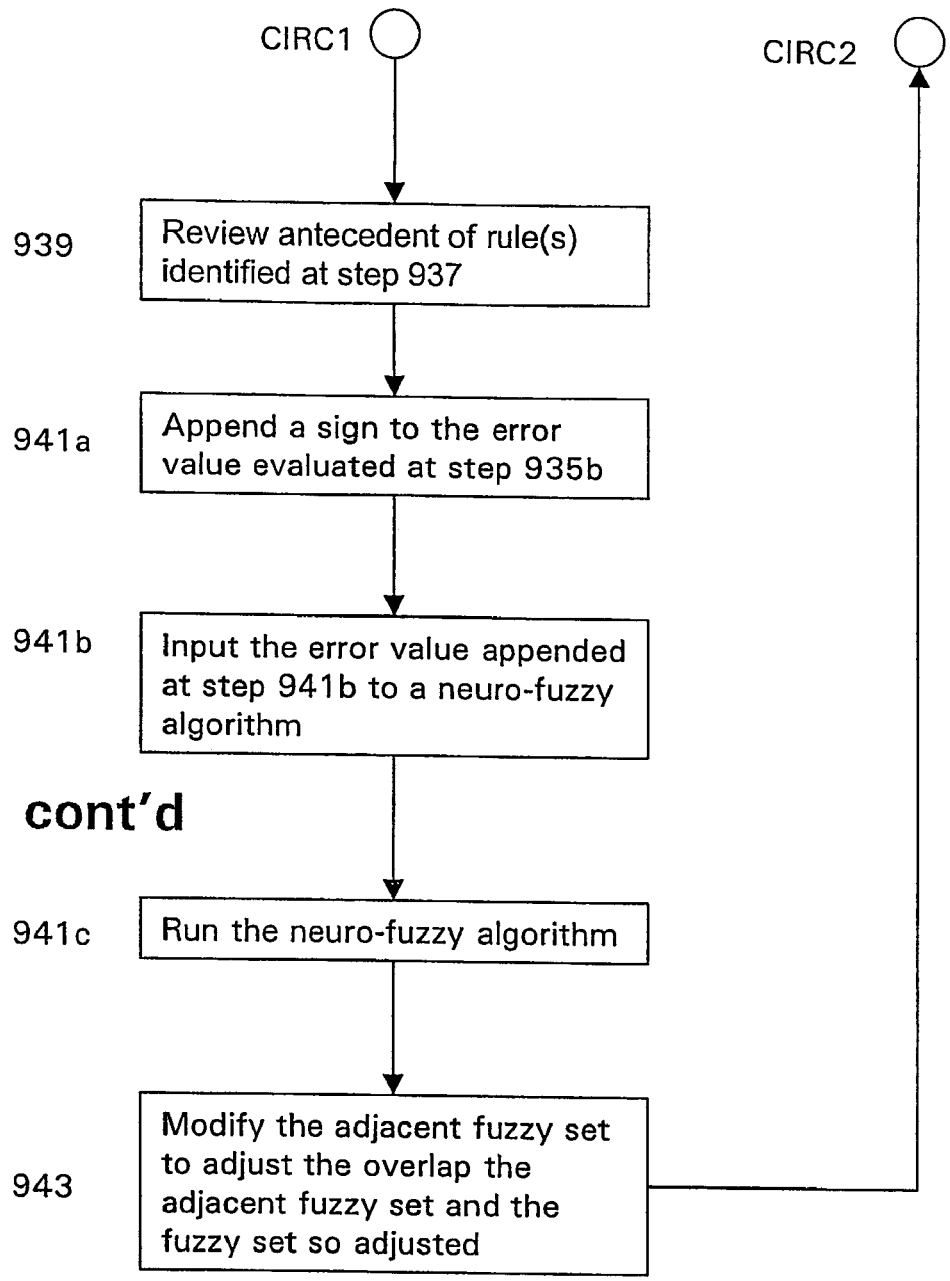

FIG. 9b shows a second embodiment wherein fuzzy sets are modified in accordance with user feedback. FIG. 9b is spread over two sheets, and connection points are represented as CIRC1 and CIRC2.

Thus referring to FIG. 9b, in the second embodiment, the monitoring program 219 asks 901 the user to rate the models built by the building program 215. In this embodiment it is assumed that the building program 215 has built more than one model. Upon receipt 903 of the user feedback, the monitoring program 219 compares 931 the user's rating with model rankings generated by the building program 215 at step 415e, as described above.

If the user's ratings differ from those generated by the building program 215, the monitoring program 219 asks 933 the user whether the model with the highest user rating matches the user's "requirements" more closely. If the user replies in the affirmative, the monitoring program 219 performs the following steps:

For each model characteristic extracted at step 409 and evaluated at step 411, an error value is generated based on the difference between the fuzzy sets evaluated at step 411 and the corresponding fuzzy sets of the user's preferred model (to re-cap, the user's preferred model is indicated by the user in response to the query at step 933).

For example, referring to the example given above (for multiple user preferences), the output of step 411 is:
number of parameters=low (0,0.0) (25,1.0) (50,0.0)
adaptability=low (0,0.0) (25,1.0) (50,0.0)
customisation=none Assuming the user indicated that the rated the decision tree learning method more highly than the linear regression method (see Tables 5-7), then for each of the model characteristics (number of parameters, adaptability, customisation), the monitoring program 219 calculates 935a a degree of correlation between the fuzzy set evaluated at step 411 and the fuzzy set corresponding to the user's preferred method. For example, the monitoring program 219 applies the equation m=sup(min(a(x),b(x)), where a(x) and b(x) represent the model characteristic fuzzy set evaluated at step 411 and the fuzzy set corresponding to the user's preferred method respectively.

The monitoring program 219 then evaluates 935b the error associated with that model characteristic by subtracting m from 1: error=1−m, which, for the above example, yields:

TABLE 9

| | Fuzzy set evaluated at step 411 | Fuzzy set corresponding to user's preferred method | M | Error |
|---|---|---|---|---|
| Number of parameters | low (0, 0.0); (25, 1.0); (50, 0.0) | Medium (25, 0.0); (50, 1.0); (75, 1.0) | 0.5 | 0.5 |
| Adaptability | low (0, 0.0); (25, 1.0); (50, 0.0) | Low (0, 0.0); (25, 1.0); (50, 1.0) | 1.0 | 0 |
| Customisation | none | Difficult (0, 1.0) (100, 0.0) | 1.0 | 0 |

The monitoring program 219 then identifies 937, from the second knowledge base KB2, at least some (preferably all) of the fuzzy rules that have a consequent corresponding to the model characteristics identified at step 411 (Number of parameters, adaptability, customisation) and whose fuzzy set corresponds to that of the model preferred by the user.

For illustrative purposes application of these steps to a single model characteristic, "number of parameters", will be described. Thus at step 937 the monitoring program 219 attempts to identify all fuzzy rules that have medium number of parameters in its rule consequent. Assuming that the following rule is stored in the second knowledge base KB2:

If simplicity is medium than number of parameter is medium R5 then as the consequent of this rule matches the fuzzy set of the user's preferred method for the characteristic "number of parameters", R5 is identified at step 937.

The monitoring program 219 then reviews 939 the antecedent of the rule(s) identified at step 937, and modifies 941 the fuzzy set (here high) relating to the user characteristic of the antecedent (here simplicity) in accordance with the user's preferences received at step 319.

In the current example, the user had specified that the preferred simple models, so the user preference is high. The fuzzy set corresponding to simplicity in rule R5 is medium. Accordingly, at step 941 the monitoring program 219 modifies the fuzzy set for high, so that it is more closely related to the fuzzy set for medium (which could be the default fuzzy set for medium, or could itself have been modified in accordance with user feedback, as described herein).

This modification can be performed in the following manner: for each non-zero error value evaluated at step 935b (for this example, there is only one: 0.5), the monitoring program 219 appends 941a a sign to the error value by comparing the fuzzy set of the user preference (high) with that of the antecedent of the rule identified at step 937 (medium); next, the monitoring program 219 inputs 941b the error value so appended to a neuro-fuzzy algorithm, together with the fuzzy sets for high and medium, and runs 941c the neuro-fuzzy algorithm.

In this way, the neuro-fuzzy algorithm modifies the fuzzy set for high in accordance with the degree of error towards the fuzzy set specified in the rule R5 identified at step 937.

Thus, for the present example, at step 941a the monitoring program 219 appends a negative sign to the error value, because high simplicity (the user's requirement) is larger than medium simplicity (the antecedent of the identified rule R5). A negative sign means that the fuzzy set for high will be decreased towards the fuzzy set of medium.

Then at step 941b the monitoring means inputs this error value (−0.5), together with the fuzzy set for high and the fuzzy set for medium, to a neuro-fuzzy algorithm (such as one of those described above), which modifies 941c the fuzzy set high simplicity such that high is defined by lower values.

Finally the monitoring means 219 modifies 943 the adjacent fuzzy set medium to adjust the overlap between high and medium. Preferably this is done by the neuro-fuzzy learning algorithm.

In at least some embodiments of the invention, evaluation of fuzzy rules at step 409 will be based on fuzzy sets stored in the user's user profile. Thus when a user states that he wants a model that is simple (i.e. highly simple), the identifying program 213 will access his user profile to retrieve the fuzzy set corresponding to high for the user characteristic simple. Then, at steps 415a, 415b, where the identifying program 213 evaluates correlation between fuzzy sets of user characteristics and fuzzy sets of model characteristics, the identifying program 213 utilises the user specific fuzzy definitions.

This can be illustrated by means of an example: assume, as above, that the user wants a "simple" model and that his idea of "simple" is different from the default definition of simple in the rule. Specifically the user has some experience in data analysis and thus considers slightly more complex models to be "simple". Assume that the high fuzzy set for user characteristic simple has accordingly been modified (step 917) and is now defined as (40, 0.0); (50; 1.0); (100, 1.0).

Assume that at step 407, the following rule has been identified

If simplicity is high then number of parameters is low [R1]

Step 409, which involves evaluating rules relevant to user preferences, additionally involves matching 409a (step not shown) the default definition of high with the user's definition of high. Preferably the equation m=sup(min(a(x), b(x))), where m is the degree of match, and a and b are the default and user-specified fuzzy sets respectively, is applied. In this example m=1.0, meaning that the identified rule is completely applicable. (i.e. the result would be the same if the user's idea of simple was the default definition). If the degree of match were less than 1.0, the conclusion of rule R1 would be capped in accordance with the reduced degree of match.

Proactive Recitation of User Preferences

In addition to saving user-specific definitions of fuzzy sets in the user profile, the monitoring program 219 is operable to store user preferences captured by the capturing program 211. The monitoring program 219 is additionally operable to evaluate the user's most frequently selected user preferences, and to save these in the user profile.

In a first embodiment, and as described above in the context of the capturing program 211, the user enters his preferences manually. In other embodiments, the capturing program 211 can retrieve, from the user profile, the user's most frequently selected preferences, and present these to the user proactively.

Referring to FIG. 3, step 317, of requesting user preferences, could comprise asking the user the following question:

Your current user profile shows that you prefer interpretable, simple and fast models. Do you want to change the preferences for this analysis?

Should the user reply in the affirmative, the capturing program 211 is adapted to request 318 (step not shown) fresh user preferences, and receive them as described above, at step 319.

Additional Uses of the Modifying Program 219

The following sections describe the functionality of the programs making up the data analyser 200 for the specific example of database querying. Parts that are similar to those described above for the first embodiment have like numerals and are generally not described in further detail.

In this embodiment the modifying program 219 is not being used to improve match between user preferences and data analysis methods, but is being used to identify items in a database that more closely match the user requirements. In the following description it is assumed that the database either includes fuzzy set entries, or is in operative association with a process that takes database entries and translates the entries into fuzzy sets (using, for example, the method described above for translating a discrete number of parameters into a fuzzy set).

Thus referring to FIG. 3, the capturing program 211 only requests 301 the user to specify a subject of interest (for which data is to be retrieved from the database), and then, at step 317, requests the user to specify preferences relating to that subject.

For example, suppose the user inputs "restaurants" as a subject of interest, and the following preference information relating thereto:

| | Instance of user characteristic | | |
| USER CHARACTERISTICS | High | Low | Medium |
| --- | --- | --- | --- |
| expense | X | | |
| proximity to centre | X | | |
| opening hours (high = late) | | | X |

This is collected at step 319 and translated into fuzzy sets, as described above, at step 321.

The identifying program 213 then connects to the database, in a manner known to those skilled in the art, and identifies database entries relating to the user characteristics expense, proximity, opening hours etc. The identifying program 213 then retrieves fuzzy sets corresponding to these entries, and identifies, using the method described above (step 415b in the first and second embodiments), restaurants that match the user preferences received at step 319.

The monitoring program 219 then presents the identified restaurants to the user, as described above at step 901, and asks the user to rank the restaurants. The monitoring program 219 then proceeds to process the information as described above with reference to FIG. 9a, thereby modifying fuzzy sets for high to match more closely the user's perception of, say, an expensive restaurant, or a restaurant that opens late etc.

This aspect of the data analyser 200 could be used in retail scenarios, such as shopping, where user perceptions of characteristics such as high and low quality, highly and mildly fashionable, high and low durability etc., would be expected to vary between users, and indeed between product types.

The capturing program 211 would capture user product requirements, including type of product and user preferences in respect of those products.

In retail embodiments, the knowledge base KB would be expected to store rules relating user characteristics (quality, fashion, durability etc) to product characteristics such as country of origin, delivery lead times, suppliers, trademarks, etc. For example, a rule of the following form:

If quality is high then supplier is dependable could be stored in the knowledge base KB.

The functionality of the identifying means 213 described in the first embodiment would similarly apply in this embodiment, as selection of a product is dependent on selection of such fuzzy rules (steps 407, 409). In addition, the products themselves will be rated in accordance with the product characteristics, as described above for model characteristics with reference to Table 5, so that steps 411, 413, 415a, 415b, 415c and 415d will similarly be performed to identify products that match the user's preferences most closely.

Thus for these embodiments a table, similar to that presented in Table 5, would be stored in the knowledge base KB, detailing product characteristics for each product listed therein.

The products will be ranked, as described above at step 415e, and presented to the user for feedback as described with reference to FIGS. 9a and 9b. Thus the fuzzy set defining high quality, medium durability etc. will be modified in accordance with the user's individual perception of the goods and how they relate to user characteristics.

Additional Implementation Details

Preferably the data analyzer 200 is written in the Java programming language, but this is not essential to the invention.

Figure 10:
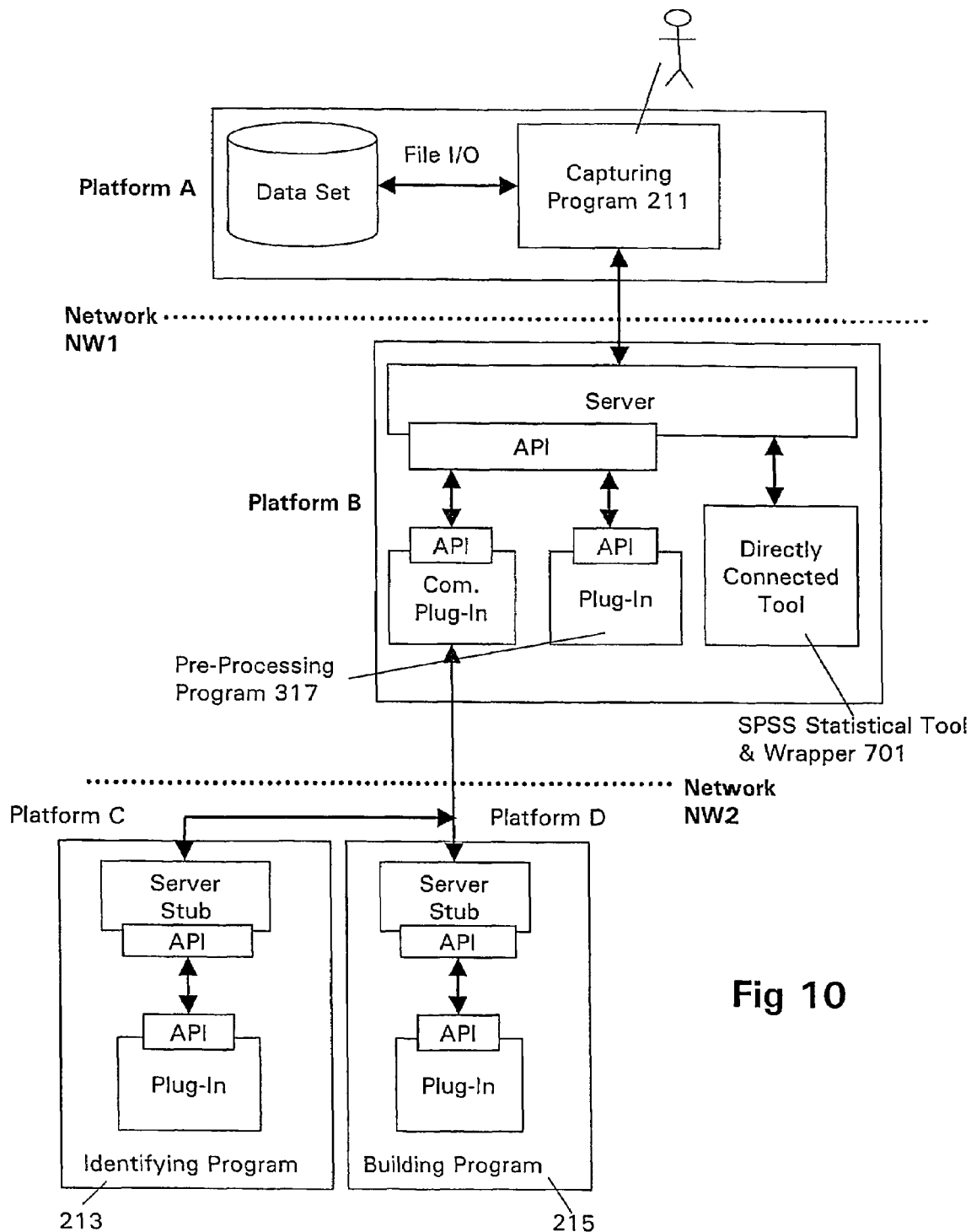
FIG. 10 is a schematic block diagram showing an alternative arrangement of the data analyser shown in FIG. 2.

As an alternative to the arrangement shown in FIG. 2, the programs 211, 213, 215, 217, 219 can be distributed over any number of computers. The server 20 has a plug-in application program interface (API), meaning that functions (programs 211, 213, 215 etc, knowledge bases KB, KB2, external and bespoke data analysis methods 703 etc) can be provided in modules (plug-ins) that are then plugged into the server via the plug-in API, as shown in FIG. 10.

As described above, the capturing program 311 will typically be an applet, which engages in a simplified user dialogue and hides the complexity of the data analysis process from the user. As an alternative, the capturing program 311 could be an expert interface, in the form of a visual programming tool, which provides the user with complete control over the analysis process. An expert user interface enables the user to specify data analysis methods and processes by creating, configuring and connecting blocks that represent certain functions.

As a further alternative, the capturing program 311 could be a machine interface that accepts text commands and can be used by agents and software robots (software tools that would use the data analyser 200 to carry out dedicated data analysis on a regular basis without user intervention).

Additional Uses of the Data Analyser 200

In addition to analysing data and representing the results in order to perform predictions, or to identify patterns in the data, the data analyser 200 could be used to facilitate decision-making. For example, the data analyser 200 could include additional programs (external tools that interface with the data analyser 200 via plug-ins) that monitor network traffic (mobile and/or fixed networks), and feed the traffic data into the data analyser 200 for analysis thereof. The data analyser 200 could be configured to classify "normal", "busy", "viral" etc. traffic behaviour, and, having performed the classification, could be used to analyse incoming data against these classifications.

The data analyser 200 could then be used to detect alarm situations, and to couple detection of an alarm situation with a series of actions that change certain variables in order to move from a critical state to a non-critical state.

Software agents are autonomous computer programs acting on behalf of users without requiring direct intervention. Agents that search the Web for information could try to locate prospective data sources in order to answer queries by its user. Once data sources are located, the agent could connect to the data analyser 200, and ask the data analyser 200 to perform a particular type of data analysis on the data sources. The agent would then communicate the result of the analysis back to user.

For example, the user could pose a query, such as "what will the sterling/dollar exchange rate be next month", to a software agent. The agent would locate a suitable financial time series (e.g. by searching on the Internet), and submit the time series (using a machine interface, as described above) to the data analyser 200, together with a request for a prediction of next month's exchange rate. This request and time series data would be input to the identifying program 213, as described above, and a model would be built (as described above) by the building program 215. The result would be delivered back to the user via the agent, together with some information about the expected reliability of the prediction and the source of the data.

What is claimed is:

1. A method of selecting a data analysis method from a plurality of such data analysis methods by applying fuzzy logic to characteristics of those data analysis methods to select the data analysis method from the plurality that most closely matches a fuzzy set of user-defined preferences for such characteristics, said method of selecting comprising:
   (i) using the user preference to identify one or more rules corresponding to the user preference, each rule comprising at least one fuzzy set that relates features of data analysis methods to data analysis characteristics;
   (ii) evaluating each identified rule, thereby identifying an instance of a data analysis characteristic associated with the identified rule, the instance comprising a fuzzy set having a range of values;
   (iii) retrieving data identifying a plurality of data analysis methods, each of which has a plurality of data analysis characteristics, wherein, in respect of each said data analysis characteristic, the retrieved data includes a range of values;
   (iv) comparing the retrieved data with the data analysis characteristic instance in order to identify a data analysis method that matches the user preference; and
   (v) outputting data identifying the data analysis method that matches the user preference.

2. A method as in claim 1, in which, when a plurality of rules is identified at step (i), the evaluating step (ii) comprises identifying occurrences of each data analysis characteristic, so that, if there is more than one occurrence of any data analysis characteristic, the evaluating step (ii) includes combining instances corresponding thereto so as to generate a combined instance of that data analysis characteristic.

3. A method as in claim 1, in which the comparing step (iv) comprises correlating the instance identified at step (ii) with the retrieved data.

4. A method as in claim 1, including the step of specifying a type of data analysis method and performing the said selection of a data analysis method in accordance with the specified type.

5. A method as in claim 4, including removing retrieved data in respect of any data analysis methods that are not of the specified type.

6. A method as in claim 1 including:
   for one or more data analysis methods, modifying the range of values comprising the fuzzy sets corresponding to at least one of the data analysis characteristics in such a manner as to increase the number of data analysis methods that match the user preference.

7. A method as in claim 1, including:
   (i) ranking the identified methods in accordance with their degree of match with the user preference;
   (ii) receiving an indicator representative of which of the identified data analysis methods best matches user requirements; and
   (iii) modifying the fuzzy set corresponding to the user preference in accordance with at least one aspect of the indicated data analysis method.

8. A method as in claim 7, in which the step of modifying the fuzzy set includes:
   comparing the range of values of the user preference with the range of values in the characteristic of the best match data analysis method in order to evaluate an error value; and
   using the error value to modify the range of values in the user preference.

9. A method as in claim 1, including:
   receiving data for use in creating a model corresponding to the identified data analysis method, the model comprising one or more model parameters;
   inputting the data to a learning process associated with the model;
   invoking the learning process, thereby modifying at least one of the model parameters, and monitoring the same;
   comparing each monitored model parameter with a control rule comprising at least one fuzzy set relating to one or more model parameters, so as to identify whether the control rule should be applied, and if so, evaluating the control rule; and
   modifying the learning process in accordance with the evaluated rule.

10. A tangible digital storage medium containing a computer program, or a suite of computer programs, comprising a set of instructions to cause a computer, or a suite of computers, to perform the method as in claim 1.

11. Server apparatus for selecting a data analysis method in accordance with a user preference, wherein the user preference relates to a feature of the data analysis method and is represented by a fuzzy set comprising a range of values, wherein the server apparatus has access to a first storage device for storing one or more rules, each rule comprising at least one fuzzy set that relates features of data analysis methods to data analysis characteristics, and a second storage device for storing a plurality of data analysis methods, each having a plurality of data analysis characteristics, each of which data analysis characteristics comprising a fuzzy set having a range of values, the server apparatus comprising:
   (i) identifying means for identifying a rule, from the first storage device, corresponding to the user preference;
   (ii) evaluating means for evaluating the identified rule, thereby identifying an instance of a data analysis characteristic associated with the identified rule, the instance comprising a fuzzy set having a range of values;
   (iii) comparing means for comparing data analysis characteristics associated with the data analysis methods stored in the second storage device with the identified data analysis characteristic instance in order to identify a data analysis method that matches the user preference; and
   (iv) means for outputting data identifying the data analysis method that matches the user preference.

12. Client apparatus for selecting a data analysis method in accordance with a user preference, including: receiving means for receiving a user preference specifying a feature of the data analysis method, the user preference being represented by a fuzzy set comprising a range of values, wherein the client apparatus co-operates with server apparatus having access to a first storage device for storing one or more rules: each rule comprising at least one fuzzy set that relates features of data analysis methods to data analysis characteristics, and a second storage device for storing a plurality of data analysis methods, each of which has a plurality of data analysis characteristics, each of which data analysis characteristics comprising a fuzzy set having a range of values, the server apparatus comprising:
   (i) identifying means for identifying a rule, from the first storage device, corresponding to the user preference;
   (ii) evaluating means for evaluating the identified rule, thereby identifying an instance of a data analysis characteristic associated with the identified rule, the instance comprising a fuzzy set having a range of values;
   (iii) comparing means for comparing data analysis characteristics associated with the data analysis methods stored in the second storage device with the identified data analysis characteristic instance in order to identify a data analysis method that matches the user preference; and
   means for outputting data identifying the identified data analysis method to the client, and wherein the client apparatus is arranged to display said output data.

* * * * *